Oct. 8, 1968    E. A. HARTBAUER ETAL    3,404,609
GROUP COLLATOR APPARATUS AND METHOD
Filed Oct. 11, 1965    14 Sheets-Sheet 7

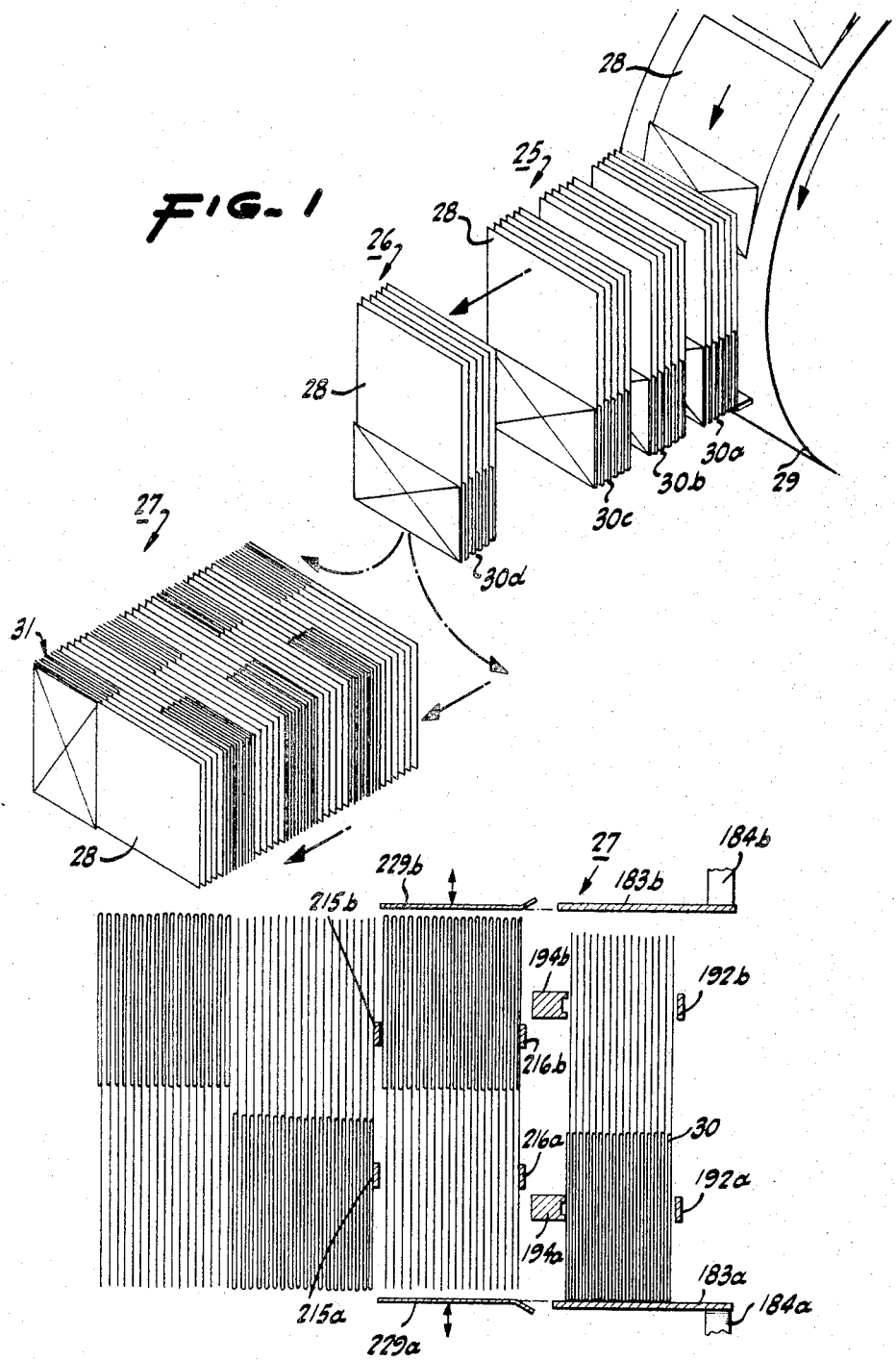

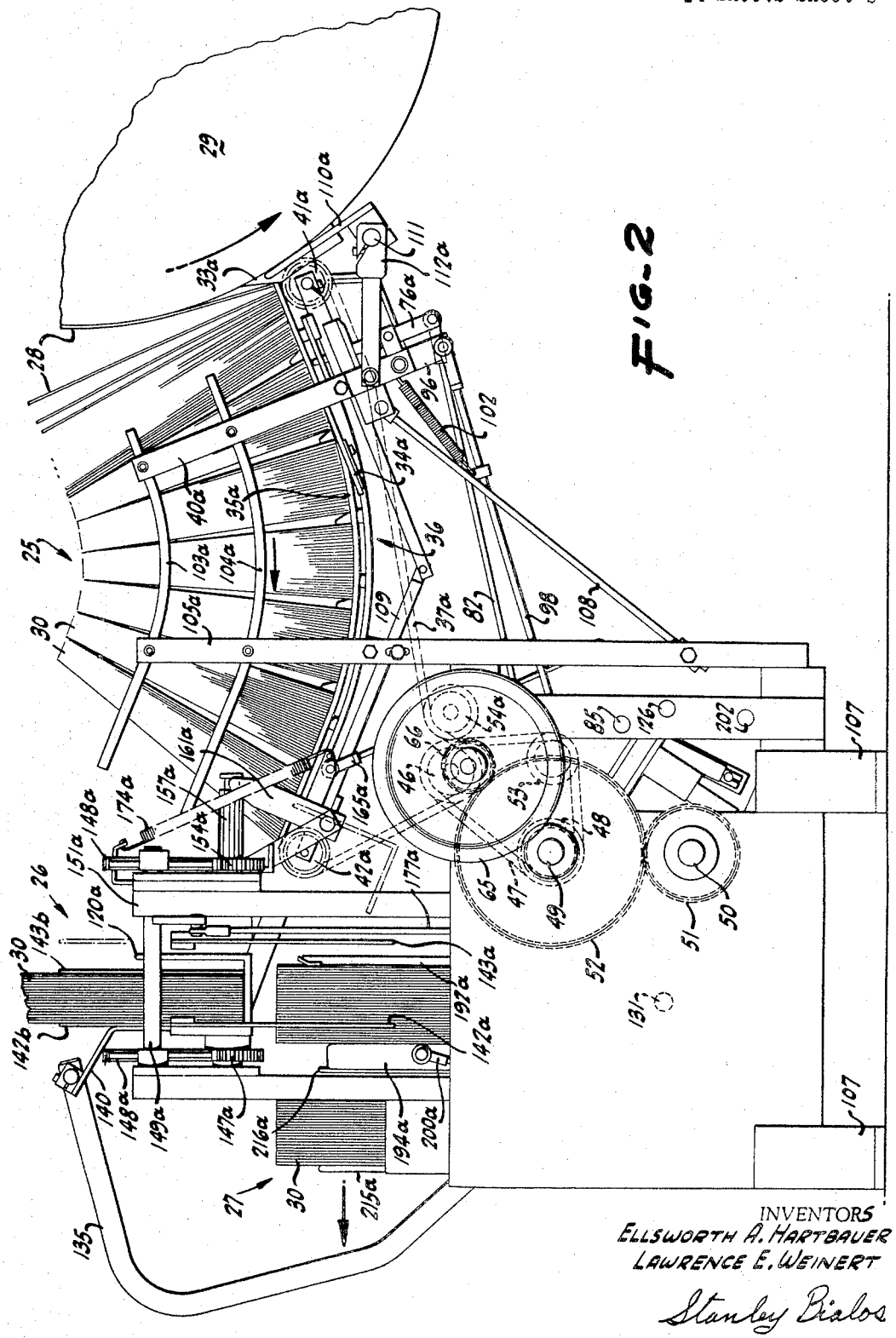

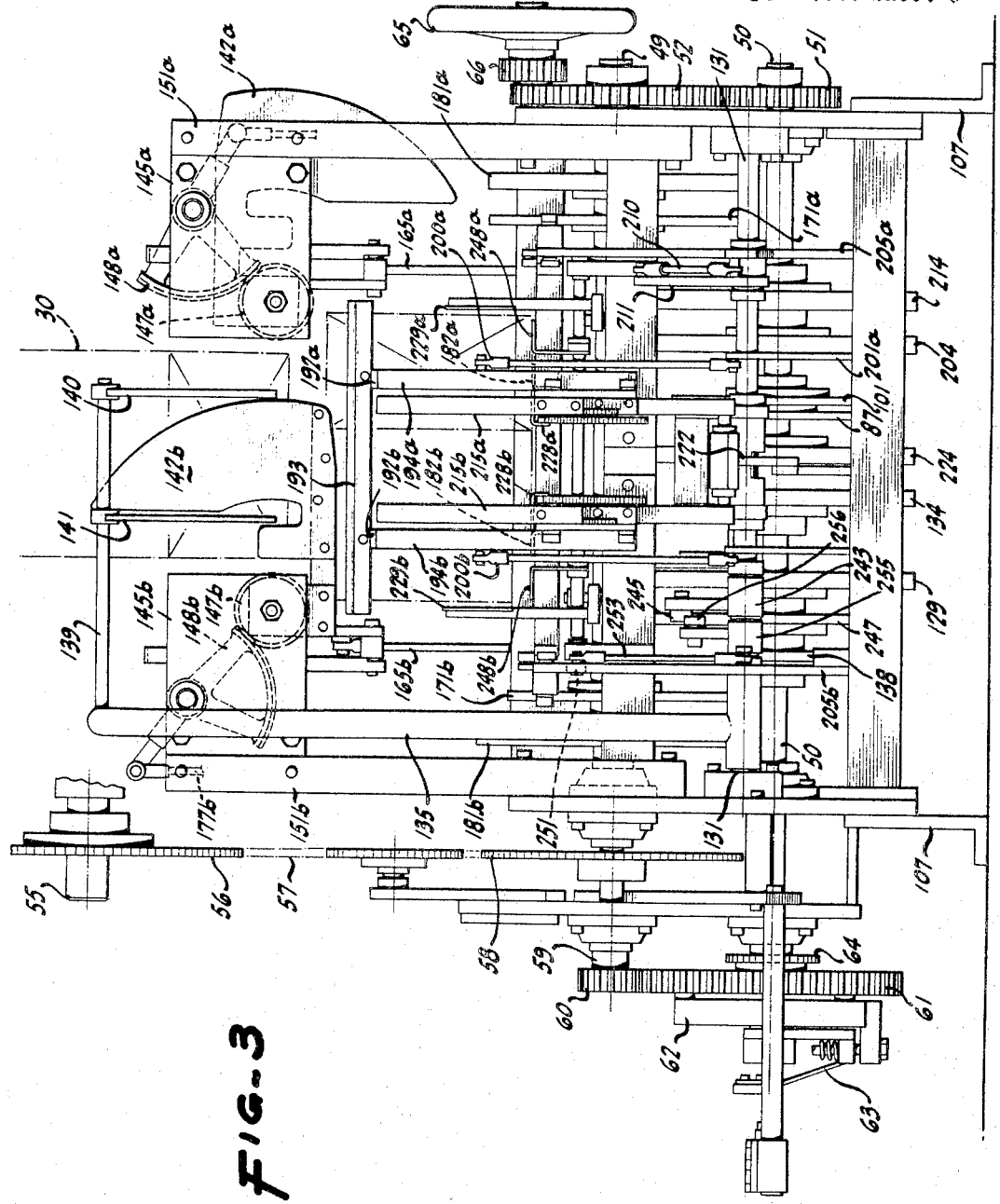

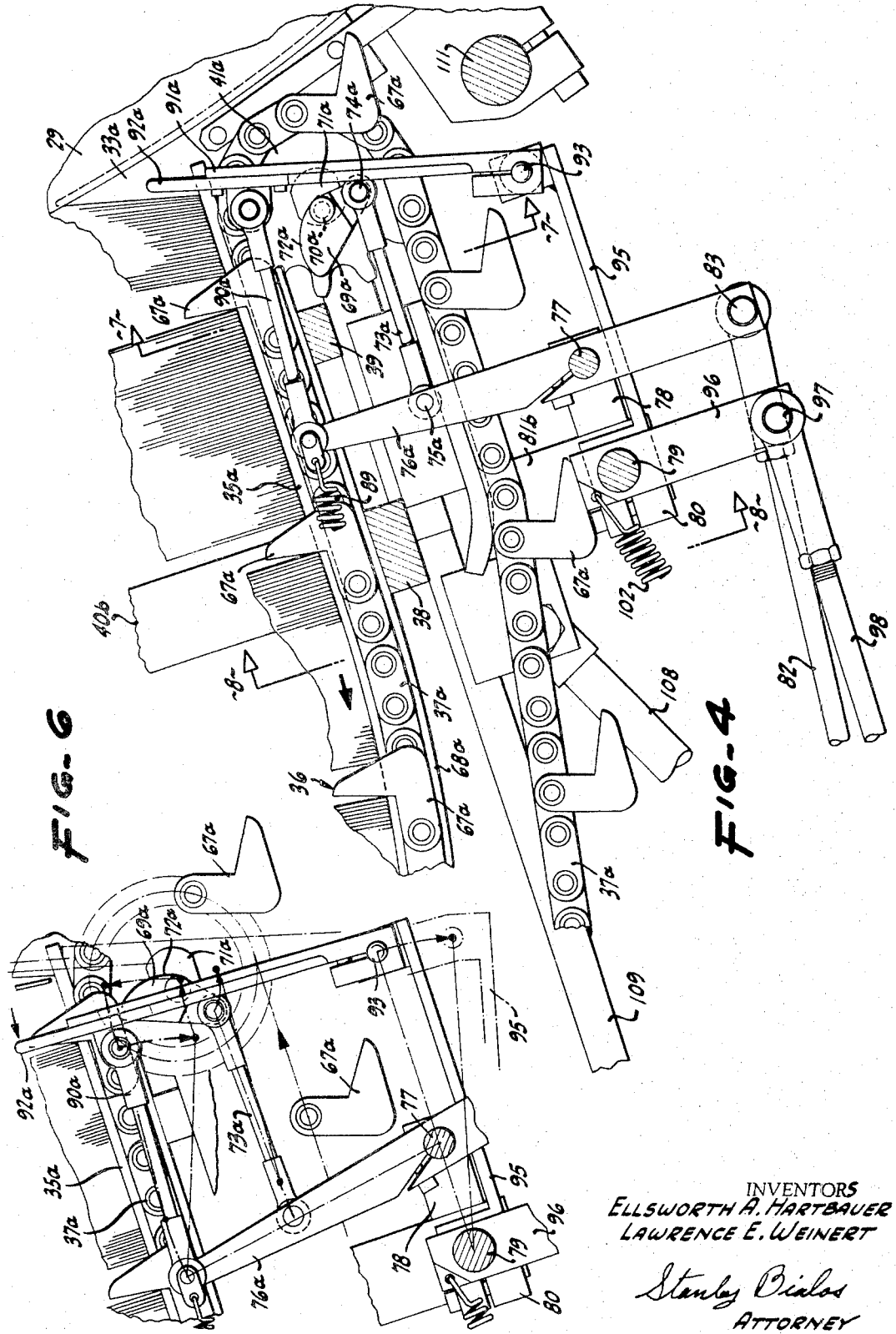

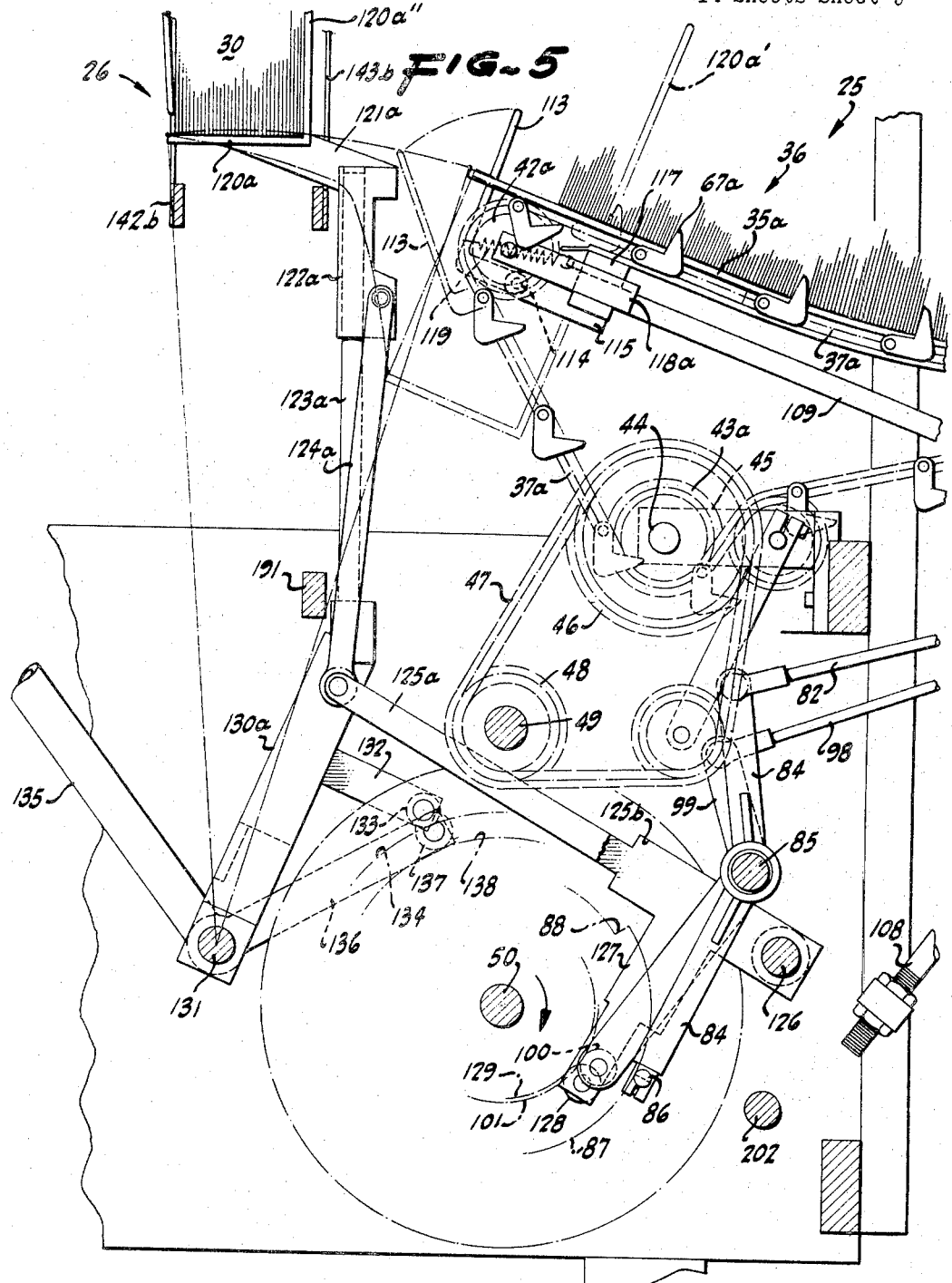

INVENTORS
ELLSWORTH A. HARTBAUER
LAWRENCE E. WEINERT

Stanley Bialos
ATTORNEY

FIG-12

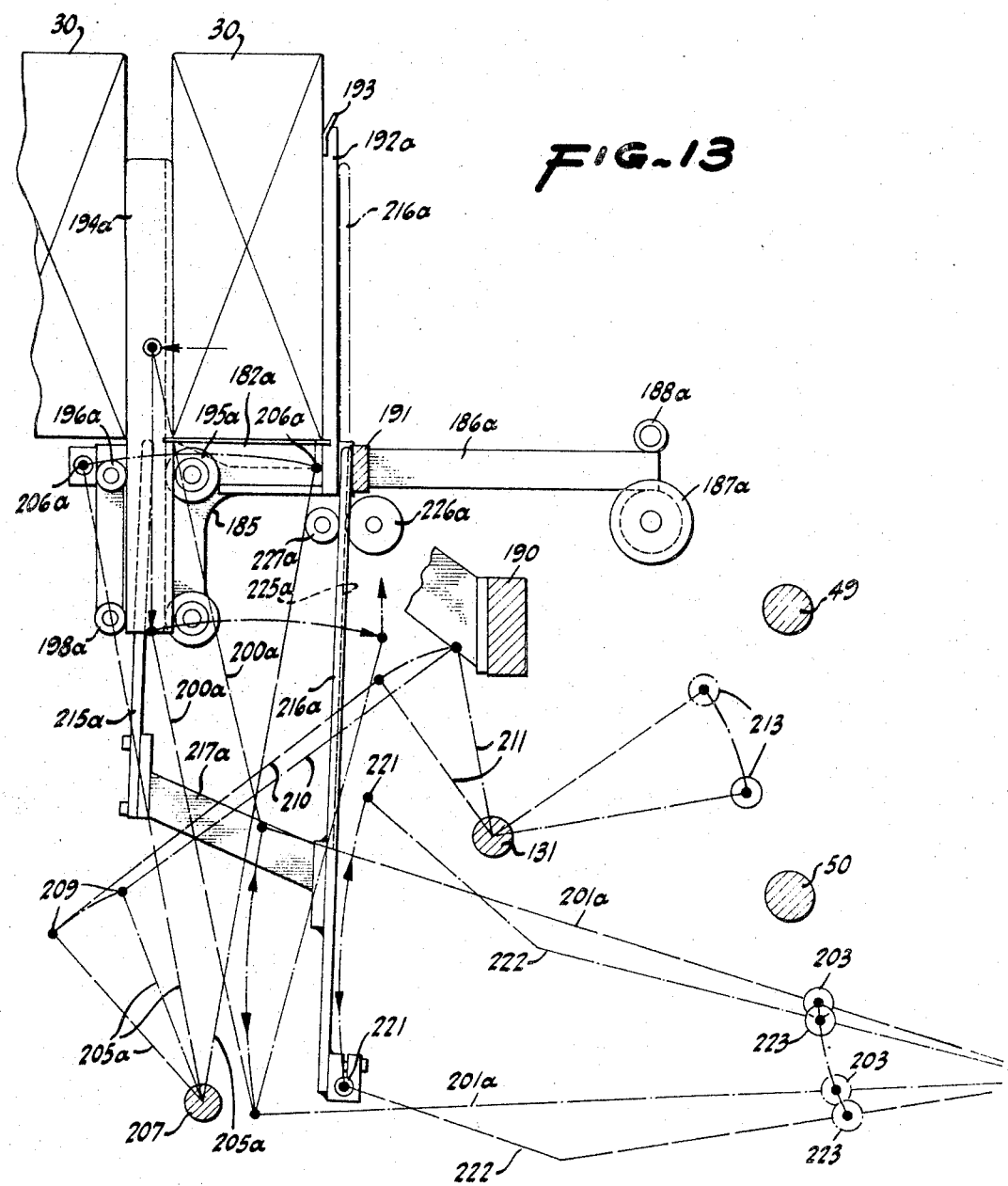

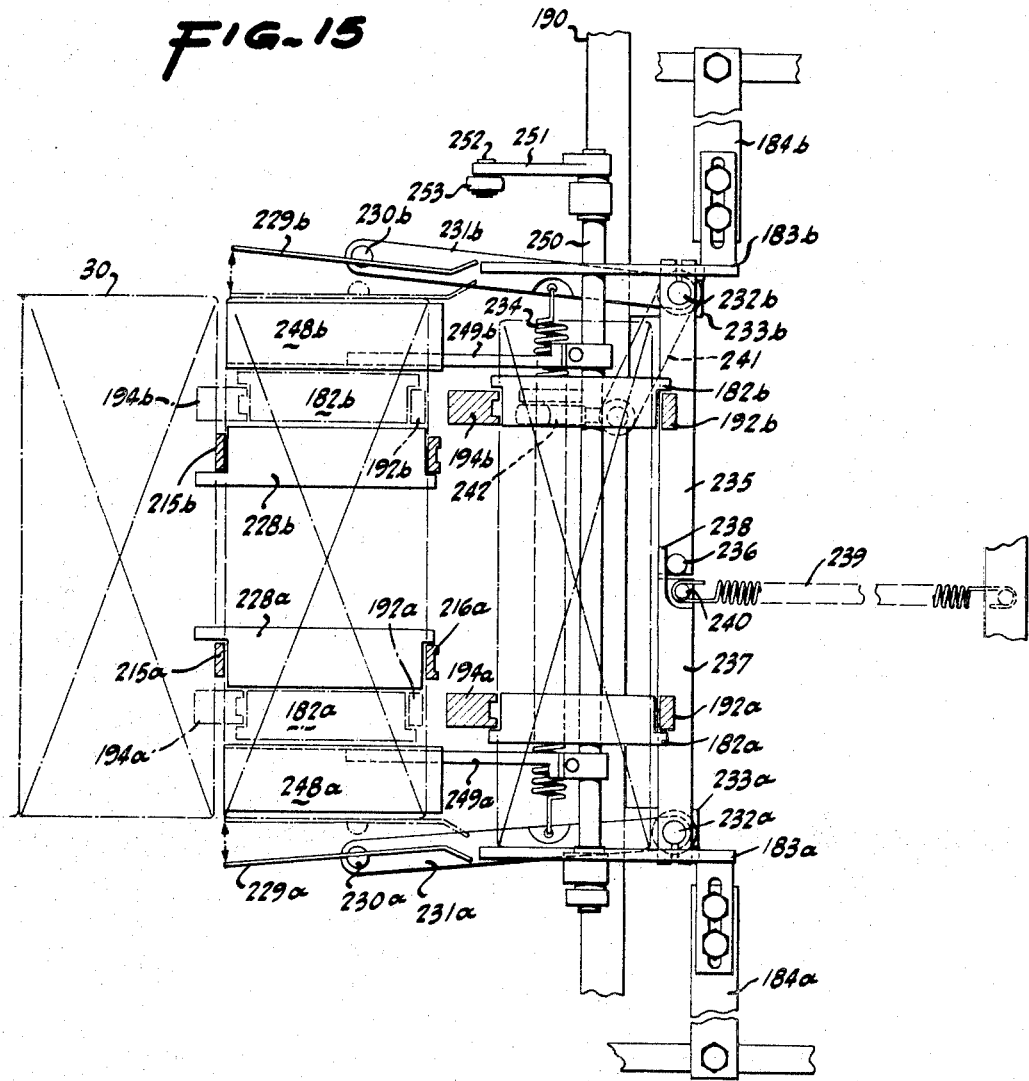

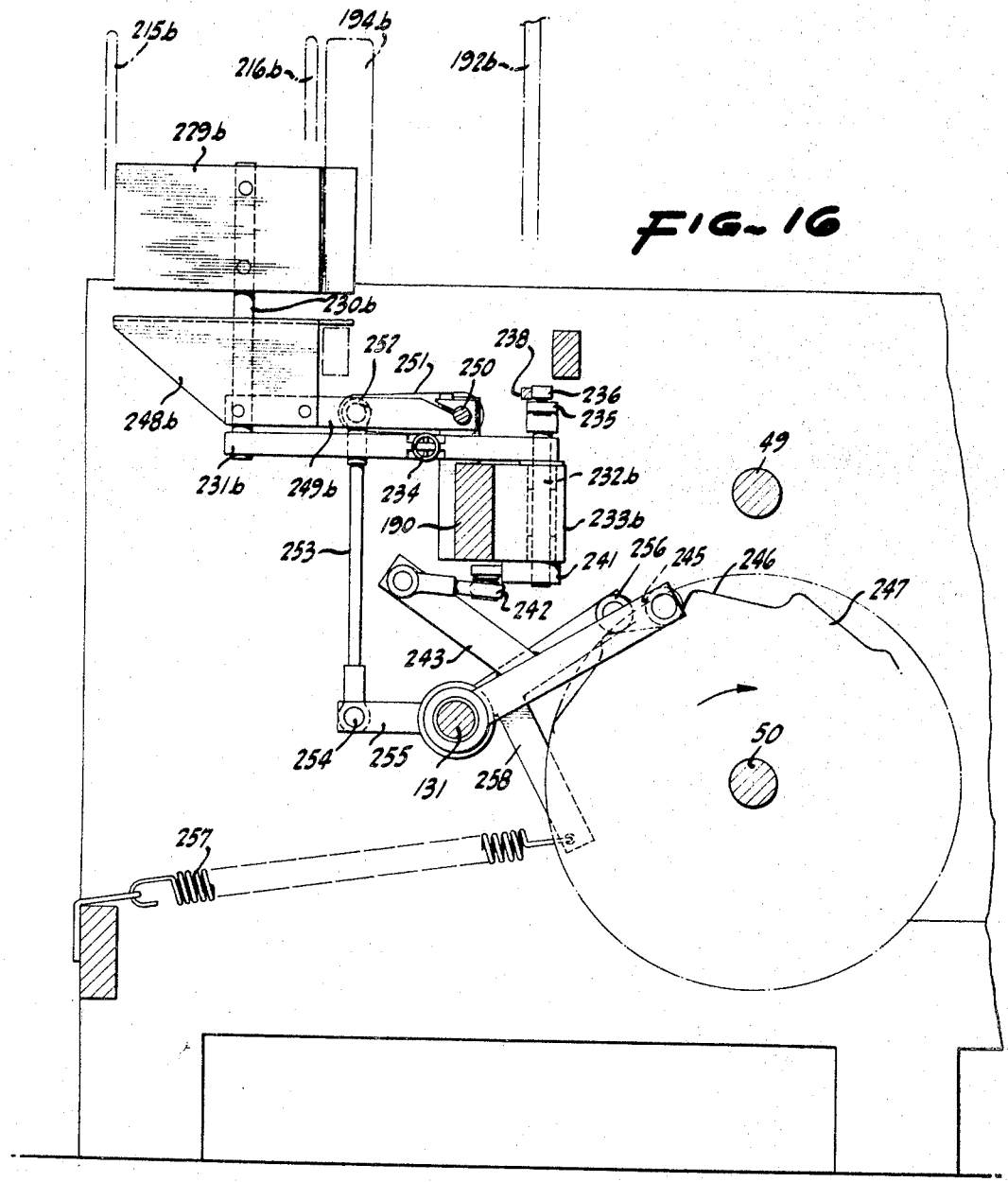

United States Patent Office 3,404,609
Patented Oct. 8, 1968

3,404,609
GROUP COLLATOR APPARATUS AND METHOD
Ellsworth A. Hartbauer, Concord, and Lawrence E. Weinert, Antioch, Calif., assignors to Crown Zellerbach Corporation, San Francisco, Calif., a corporation of Nevada
Filed Oct. 11, 1965, Ser. No. 494,742
20 Claims. (Cl. 93—93)

ABSTRACT OF THE DISCLOSURE

Method of and apparatus for collating paper grocery bags thereof collated into an end-for-end orientation, and of moving each angularly displaced group from the collating or turning station preparatory to bundling the groups. The apparatus includes group forming mechanism by means of which such continuous succession of bags discharged along a predetermined path are divided into groups, conveyor mechanism for moving each such group into the collating or turning station, first and second collating devices for respectively gripping and displacing alternate groups in opposite angular directions at the collating station, and transfer mechanism for advancing each angularly displaced group of bags from the collating station.

---

This invention relates to an article collating apparatus and method and, more particularly, to apparatus for collating articles by group rather than individually. The apparatus is useful, for example, in group-collating paper grocery bags as they are discharged from bag-making machinery.

Considering use of the invention with paper grocery bags, the bag articles are fabricated at relatively high speeds and are discharged in essentially uninterrupted, continuous succession from the bag-making machinery. The bags at the time of such discharge are all oriented in the same direction and are moving along a predetermined path. Each bag is much thicker adjacent its bottom end than elsewhere therealong because of the overlapped layers of material required to close the bag bottom and also because the closed bottom of each bag is, in part, folded against the side wall thereof in overlapping relation therewith. Consequently, as the bags are discharged from the bag-making machinery with their closed and folded bottoms all oriented in the same direction, any direct grouping or collection of bags results in a bundle of irregular dimensions unsuitable for storage and shipment.

Accordingly, it is customary for bags discharged from bag-making machinery to be collated or processed in a manner such that successive bags or groups thereof are alternately turned in opposite directions in order that certain of the bags have the bottoms thereof facing in one direction and other of the bags have the bottoms thereof facing in the opposite direction. Thus, any bundle comprising a plurality of such collated bags is of relatively uniform dimensions and is therefore conveniently handled during banding of the bundle and subsequent shipment and storage thereof.

The present invention constitutes an improved method of and apparatus for collating articles such as paper grocery bags and the like, and involves processing or handling the articles in groups or hands with the result that the collating operation may be carried on at much slower speeds than where individual articles are collated —for example, in the ratio of 1-to-50 where each such group comprises fifty bags. In carrying out the invention, the bags, which are delivered in a continuous stream at high speed from the bag-making machinery, are diverted from such stream and are collected in side-by-side relation with the bottoms thereof all oriented in the same direction. The collected bags are divided into groups or hands, each of which comprises a predetermined number of bags. The thusly formed groups are then collated, which operation includes transferring each group of bags into a turning station and then turning or rotating each transferred group through an angular distance of approximately 90°—successive groups being turned in opposite directions. The collated groups are then assembled for bundling, which assembly operation includes advancing each collated group from the terminal end of the turning or collating station and aligning all of the bags in any one group with each other and with the bags of other groups so that the top, bottom and longitudinal edges of all of the bags are essentially coextensive.

Objects and advantages of the invention, especially as concerns specific features and characteristics thereof, will become apparent from the following detailed description taken in conjunction with the accompanying drawings, in which:

FIGURE 1 is a diagrammatic perspective view depicting the overall operational sequence and general steps in the group-collating procedure;

FIGURE 2 is a broken side view in elevation of collating apparatus embodying the invention;

FIGURE 3 is a front view in elevation of the apparatus, the view being taken essentially from the left as viewed in FIGURE 2;

FIGURE 4 is an enlarged, broken vertical sectional view of the group-forming section of the apparatus adjacent the discharge end of the bag-making machinery;

FIGURE 5 is an enlarged, broken vertical sectional view of the terminal end portion of the group-forming section;

FIGURE 6 is an enlarged, broken vertical sectional view similar to that of FIGURE 4 but showing certain elements of the group-forming mechanism in an alternate position.

FIGURE 12 is an enlarged, longitudinal sectional view showing the group-assembly section of the apparatus and particularly the drive linkages thereof;

FIGURE 13 is an essentially diagrammatic view of the structure shown in FIGURE 12, but with the linkages omitted and the paths of their motions being depicted instead;

FIGURE 14 is a somewhat diagrammatic view showing the alignment unit of the group assembly section;

FIGURE 15 is a horizontally oriented, longitudinal sectional view illustrating the assembly section of the apparatus;

FIGURE 16 is a vertical sectional view of the alignment portion of such section.

General description

Figure 8:
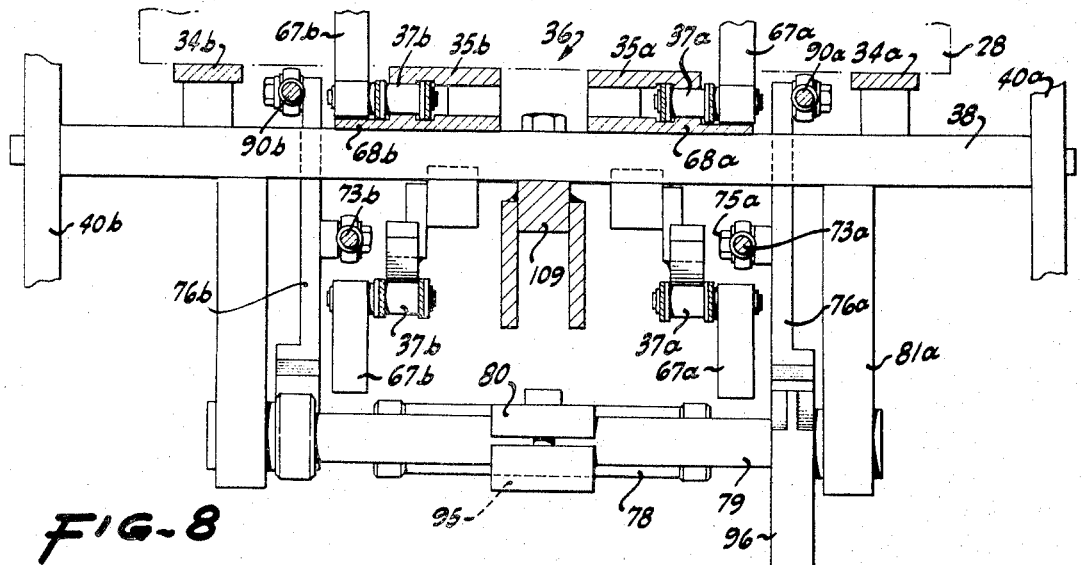
FIGURE 8 is a transverse sectional view taken along the line 8—8 of FIGURE 4.

Prior to describing the apparatus in detail, it may be convenient to consider a general overall description thereof and in this connection, particular reference will be made in FIGURE 1.

The group-collating apparatus in its entirety may be thought of as comprising three sections identifiable as a group-forming or collection section 25, a group-collating section 26, and a group-assembly section 27. The articles being collated are advanced in order through such sections, and in the particular apparatus being considered the articles processed are self-opening, paper grocery bags denoted with the numeral 28. The bags 28 may be fabricated on standard machinery in a conventional bag-making line, which machinery in the usual instance includes a drum or cylinder from which bags 28 are discharged along a predetermined path in a substantially endless stream comprising a continuous succession of bags all oriented in the same direction (the closed bottom ends thereof leading in the subject apparatus).

The bags 28, it will be evident, are wholly conventional and therefore are open at their tops, have closed bottoms, and the bottoms are folded so that a portion thereof overlaps the side wall of the associaetd bag. Thus, each bag is substantially thicker adjacent the closed bottom end thereof and overlapped area than at its top end and elsewhere, and this results in the requirement that the bags be collated or disposed alternately, either individually or in groups, so that a bundle of bags (which in the present instance comprises a plurality of groups) will be of substantially uniform dimensions.

In the present apparatus, the group-forming section 25 serves to collect in side-by-side relation the bags 28 being discharged in succession from the drum 29, and to divide or collect the bags into groups or hands which, in FIGURE 1, are denoted 30a, 30b, etc. The groups 30 are advanced in order into the collating section 26 (as depicted by the group 30d in FIGURE 1), and successive groups are turned in opposite angular directions through arcuate distances of substantially 90°, as indicated by the paths described by the curved arrows. After such collating of the successive groups, they are assembled in the section 27 preparatory for bundling. The assembled groups shown at section 27 in FIGURE 1 could constitute a bundle or a partial bundle, and the assemblage is denoted in its entirety with the numeral 31. As a typical example in terms of numbers, a group 30 might comprise fifty bags and a bundle could constitute ten such groups or a total of 500 bags.

*Group-forming section*

In describing the group-forming or group-collecting section of the collating apparatus, reference will be made in particular to FIGURES 2 and 4 through 8.

As indicated hereinbefore, the section 25 is operative on the bags 28 being discharged in succession from the drum 29 to collect such bags in side-by-side relation and divide the same into groups. In accomplishing this result, each bag 28 is stripped from the drum 29 and the downward movement of the bag arrested. More especially, the drum 29 (see FIGURE 7) is provided with a plurality of grooves 32a, 32b, 32c, 32d spaced apart transversely along the circumferential surface thereof, and respectively seated within such grooves are stationary strippers 33a, 33b, 33c and 33d. Thus, as the drum 29 advances the bags downwardly, the stripper fingers 33 ride under the leading bottom end of each bag and displaces it laterally from the surface of the drum.

As each bag is urged laterally from the drum, the downward motion of the bag is terminated by abutment of the bottom end thereof with a pair of transversely spaced stops or bars 34a and 34b that are essentially flat and are aligned with each other. The bars 34 are located outwardly of the strippers 33a and 33d (see FIGURE 7) and are fixed components suitably supported by the framework of the apparatus. Cooperating with the stops 34 in terminating downward movement of each bag are stationary guides or tracks 35a and 35b forming part of a group-feeding conveyor generally denoted with the numeral 36. The tracks 35 are located interiorly of the strippers 33b and 33c, and, as shown best in FIGURE 7, the tracks extend laterally and downwardly in substantially parallel relation with the stops 34 for a considerable distance, and then commence to curve away from the straight-line path of the stops and finally curve upwardly toward the collating section 26.

The conveyor 36 also includes a pair of endless conveyor chains 37a and 37b respectively associated with the tracks 35a and 35b, and such tracks effectively define the path of movement of the upper reach or branch of the conveyor chains to enable the same to traverse the arcuate, generally concave path defined between the bag drum 29 and the collating section 26. The tracks 35 may be welded or otherwise rigidly secured to a plurality of transversely oriented supports such as the support bars 38 and 39, which bars are most evident in FIGURES 4, 7 and 8. The bar 38 is seen to be secured at the opposite ends thereof to side plates 40a and 40b forming a part of the framework of the apparatus.

The conveyor chains 37a and 37b are respectively entrained about sprockets 41a and 41b adjacent the bag drum 29, and also about sprockets 42a and 42b adjacent the collating station 26. Evidently, the sprockets 41 and 42 are respectively supported upon stub shafts journalled for rotation in components therefor rigidly related to the frame structure of the apparatus. The chains 37 are also respectively entrained about drive sprockets 43a and 43b keyed to a shaft 44 so as to rotate therewith. The shaft 44 is journalled for rotation in support structure 45, and it is equipped with a drive sprocket 46 connected by an endless drive chain 47 to a drive sprocket 48 mounted upon a shaft 49 that constitutes one of the two main drive shafts of the apparatus. The other such drive shaft is denoted with the numeral 50, and rotates the shaft 49 through the gears 51 and 52 which are respectively carried by the shafts 50 and 49 and are meshingly engaged with each other, as is shown best in FIGURES 2 and 3.

Evidently, as the shaft 50 is rotated, it rotatably drives the shaft 49 through the agency of the meshed gears 51 and 52; and it may be noted that because of the reduction defined by the two gears 51 and 52, the rotational ratio of the shaft 50 to that of the shaft 49 is 1-to-2. Clearly, as the shaft 49 rotates, the shaft 44 is forced to rotate because of the driving interconnection of these two shafts defined by the chain 47 and sprockets 46 and 48, and rotation of the shaft 44 enforces movement on each of the conveyor chains 37. An idler sprocket 53 may be associated with the drive chain 47; and in a similar manner, idler sprockets 54a and 54b may be respectively associated with the conveyor chains 37a and 37b.

As shown most clearly in FIGURE 3, the apparatus is driven from the bag machine and is therefore timed with the bag drum 29 and, accordingly, with the delivery of bags 28 thereby. In this respect, the bag drum 29 is equipped with a shaft 55 having a drive sprocket 56 secured thereto so as to rotate therewith. An endless chain 57 is entrained about the drive sprocket 56 and is also entrained about a sprocket 58 keyed to a shaft 59 journalled for rotation in the frame structure of the apparatus and equipped at its outer end with a spur gear 60. The gear 60 meshes with and drives a gear 61 that is freely supported for rotation relative to and about the shaft 50.

Operatively arranged with the gear 61 is a clutch 62 of conventional design, one section of which is rotatably driven by the gear 61 and the other section of which is keyed to the shaft 50 so as to drive the same. The clutch 62 is an overload safety device, and whenever it is in proper engagement, the shaft 50 is rotated. Should the apparatus become jammed, the clutch 62 will disengage whereupon the driving connection between the gear 61 and shaft 50 will be terminated. The components generally denoted as 63 constitute an arrangement for breaking the electric circuit to the main drive motor whenever the clutch 62 is disengaged. The clutch 62 and the mechanism 63 may both be of standard design and any suitable clutch arrangement can be employed, or the entire clutch feature can be omitted.

A sprocket 64 is mounted upon the shaft 50 and is provided as a power take-off means should it be desired to drive any other apparatus from the collating apparatus being considered herein. Also, a hand wheel 65 equipped with a gear 66 is included in the apparatus, as shown in FIGURES 2 and 3; and the wheel and gear are movable from the outer disengaged position thereof shown in FIGURE 3 into an inner position (displaced toward the left as viewed in FIGURE 3) to engage the gear 66 with the gear 52 and permit the apparatus to be manually advanced.

Each of the endless chains is equipped with a plurality of L-shaped lugs or flights at spaced apart intervals therealong, which lugs are pivotally related to the chains so as to be movable inwardly and outwardly with respect thereto. For purposes of identification, each of the lugs carried by the chain 37a is denoted with the numeral 67a, and those carried by the chain 37b with the numeral 67b. As the chains 37 advance a lug 67 into adjacency with the guides or tracks 35 along the upper reach of the chains, each lug engages an outwardly extending cam surface or holder 68a or 68b, as the case may be, which constrains each lug engaged thereby against inward movement, whereupon one leg of the lug is extended above the plane defined by the upper surfaces of the aforementioned members 34 and 35. The lugs are effective to maintain the bag groups 30 in spaced apart relation and to advance the same along the conveyor 36 from the infeed end thereof adjacent the bag drum 29 toward the discharge end adjacent the collating section 26.

Each lug 67 hangs loosely from the associated chain 37, as shown best in FIGURE 6, as the lug is moved along the lower reach of the chain and as it traverses the arcuate path defined by the associated sprocket 41 adjacent the bag drum 29. It is resired to rapidly displace each lug from such loosely hanging condition thereof into its projected position along the upper reach of the chains to cause each lug to be quickly inserted into the space defined between adjacent bag groups 30, which space is created and maintained for only a limited interval by divider apparatus to be described subsequently. Such sharp transition of each lug into the extended position thereof is effected by trigger mechanism illustrated best in FIGURES 4, 6 and 7; and referring thereto, it may be noted that the trigger mechanism is symmetrical with respect to the longitudinal axis of the conveyor 36. Accordingly, the mechanism has duplicate components respectively associated with the endless chains 37; and in the following description of such trigger mechanism, only the components associated with the chain 37a will be considered in detail, and those components associated with the chain 37b will be denoted in the drawings with the same numerals but with the suffix b rather than a being added thereto.

As seen in the figures noted, a trigger element 69a is supported for pivotal movement by a pin 70a carried by a bracket 71a secured to rigid components of the apparatus. The trigger element has an arcuate cam surface 72a, and is selectively pivotal between the retracted position shown in FIGURE 4 and the extended position illustrated in FIGURE 6. Movement thereof into the extended position causes the cam surface 72a of the trigger element to engage a lug 67a and cam the same upwardly and into the active group-engaging position thereof. Pivotal movement of the trigger element is enforced thereon by a link 73a pivotally secured adjacent one end thereof to the trigger element by a pin 74a. Adjacent its other end, the link 73a is connected by a pin 75a to a crank arm 76a supported intermediate its ends for angular movements about the axis of a shaft 77 which is journalled for rotation in a support 78 pivoted on a shaft 79 by support structure 80. The shaft 79 is journalled for rotation adjacent the opposite ends thereof in hangers 81a and 81b secured to the cross bar 38. Evidently, as the crank arms 76 are displaced in a counter-clockwise direction from the position thereof shown in FIGURE 4 into the position illustrated in FIGURE 6, the trigger elements 69 will be displaced angularly in a clockwise direction (compare FIGURES 4 and 6) so as to rapidly displace the respectively associated lugs 67 upwardly into the extended position thereof along the tracks 35.

Angular displacements are enforced on the crank arm 76a (and therefore on the shaft 77 and crank arm 76b) by an elongated lever arm or link 82 pivotally connected at one end with the arm 76a by a pin 83. The arm 82 adjacent its opposite end is pivotally connected to one end of a bell crank 84 that is pivotally supported intermediate the ends thereof upon a shaft 85. Adjacent its other end, the bell crank 84 is equipped with a cam follower 86 that traverses a cam which is indicated somewhat diagrammatically in FIGURE 5 and denoted by the numeral 87. The cam 87 is mounted upon the aforementioned shaft 50 and is rotatably driven thereby.

The cam 87 has a sharply stepped section 88 that permits a sharp transistion of the cam follower 86 from the outer position thereof shown in FIGURE 5, which corresponds to the inoperative position of the trigger elements 69, as shown in FIGURE 4, to an inner position corresponding to the active position of the trigger elements 69 shown as in FIGURE 6. Thus, the transition period for the trigger elements from the inoperative position to the operative position thereof is quite rapid. The cam follower 86 is resiliently biased into engagement with the cam 87 by a helical tension spring (FIGURE 4) that is connected to the arm 76a adjacent the upper end thereof.

Also connected to the arm 76a at its upper end is a link 90a. The link is pivotally connected to an arm 91a that has bolted or otherwise fixedly secured thereto a divider or counter-finger 92a. Adjacent its lower end the arm 91a is clamped to a shaft 93 journalled for rotation in support structure 94 welded or otherwise rigidly secured to a bracket or support plate 95 formed integrally with or otherwise rigidly related to the fastener structure 80. Quite evidently, as the lever arm 76a is angularly displaced in a counter-clockwise direction about the axis of the shaft 77 and into the position shown in FIGURE 6, the link 90a will be pulled toward the left, as viewed in FIGURE 4, whereupon the counter-finger 92a will be angularly displaced in a counter-clockwise direction from the position shown in FIGURE 4 into the position thereof illustrated in FIGURE 6. This function of the counter-finger is so related to the rate of delivery of bags by the drum 29 that the trigger fingers are operative to divide the bags into groups each of which has substantially the same number of bags.

As indicated hereinbefore, the shaft 79 is journalled for rotation in the hangers 81, and pivotal movements are imparted thereto by an arm 96 secured thereto at its upper end. The arm 96 adjacent its lower end is pivotally connected by a pin 97 to an elongated lever arm 98 that is pivotally connected to one end of a bell crank 99 (FIGURE 5) rivotally supported intermediate its ends on the aforementioned shaft 85. The other end of the bell crank is equipped with a cam follower 100 that rides on a cam 101 which is indicated diagrammatically in FIGURE 5. The cam follower 100 is resiliently biased into engagement with the cam 101 by a helical tension spring 102 connected to the upper end of the arm 96 (FIGURE 4).

Quite evidently, the cam 101 will be configurated so that the bell crank 99 is angularly reciprocated about the axis of the shaft 85 and, accordingly, the elongated arm 98 will be reciprocably displaced along the longitudinal axis thereof. As a consequence, the arm 96 will move the shaft 79 through pivotal displacements, whereupon the fastener structure 80 and support 95 thereof will be angularly displaced between the full-line and broken-line positions shown in FIGURE 6. Accordingly, the shafts 93 will be displaced between upper and lower positions through an arcuate distance having as its center the axis of the shaft 79, as indicated by the arrow-equipped movement lines in FIGURE 6. Thus, the counter-finger 92a will be moved between the elevated position thereof shown in FIGURES 4 and 6, in which it projects upwardly above the tracks 35 and stops 34, and a retracted position (corresponding to the broken-line illustration of the support plate 95 in FIGURE 6), in which the counter-finger is retracted to a location below the upper surface of the members 34 and 35.

In a cycle of operation, and considering the relative position of the elements as shown in FIGURE 4 to be the starting condition, it is noted that the shaft 79 has been pivoted in a counter-clockwise direction to elevate the two counter-fingers into the uppermost position thereof in which they have been inserted behind a bag just being stripped from the drum 29 by the stripper fingers 33. Also, the shaft 77 has been pivoted in a clockwise direction whereupon the counter-fingers 92 are in their extreme right-hand position, as viewed in FIGURE 4, or starting position adjacent the drum 29, and, correspondingly, in which the trigger elements 69 are retracted. As the cam 87 continues to rotate, it next causes the shaft 77 to be pivoted in a counter-clockwise direction whereupon the trigger elements 69 engage the respectively associated lugs 67, which are just traversing the arcs defined by the sprockets 91, and project such lugs quite rapidly into the space between two successive bags being discharged by the drum 29, which space is defined by the counter-fingers 92. Such pivotal movement of the shaft 77 also displaces the counter-fingers 92 toward the left and into the positions thereof shown in FIGURE 6— which displacement of the counter-fingers together with movement of the lugs 67 in the same direction advances a group 30 of bags away from the drum (the immediately prior set of lugs defines the forward side of such bag group).

At about the time that the counter-fingers 92 approach the extremity of their displacement along the conveyor 36 to advance a group 30 of bags, the cam 101 commences to pivot the shaft 79 in a clockwise direction (as viewed in FIGURES 4 and 6) to pull the counter-fingers 92 downwardly below the upper surface of the members 34 and 35. After the counter-fingers have been moved below the upper surface of the conveyor 36, the cam 87 causes the shaft 77 to be pivoted in a clockwise direction to return the counter-fingers 92 to their initial position adjacent the drum 29 preparatory to their being displaced upwardly again and into the position shown in FIGURE 4 by operation of the cam 101 to pivot the shaft 79 in a counterclockwise direction. Thus, a cycle of operation has been completed, and such cycle is repeated at a rate dependent upon the speed of delivery of the bag drum 29. Since the collating apparatus is driven from the drum 29, any change in the operating speed thereof automatically effects a corresponding change in the operating speed of the collating apparatus.

It may be noted that the number of bags in each group thereof can be altered simply by changing the diameter of the sprocket 56 (FIGURE 3), and the device may be equipped with a variable-diameter sprocket structure so that any such change can be effected quickly and easily. As indicated hereinbefore, a typical count may be fifty bags per group or hand 30.

As shown most clearly in FIGURE 2, the conveyor 36 is arcuate and describes a generally concave path that dips downwardly between the two ends of the conveyor respectively located adjacent the bag drum 29 and the collating section 26. This feature is of significance particularly where the articles being collated are elongated, as in the case of paper grocery bags, because it tends to concentrate the upper ends of such articles inwardly toward the center of the arcuate path as shown in FIGURE 2.

The groups 30 may be supported along the upwardly extending edges thereof by any suitable guide structure such as the guide bars 103a and 104a that are respectively secured to uprights 105a and 106a. The upright 105a at its lower end is welded or otherwise secured to a base or main frame structure generally denoted 107, and the upright 106a is secured to a strut 108 and to a strap composition 109. It may be noted that the stripper fingers 33 (FIGURES 2 and 7) are carried by supports 110a and 110b which at their lower ends are respectively clamped to a shaft carried at its end by brackets 112a–112b that are respectively secured to the uprights 106a–106b. Evidently, the precise location of the stripper fingers may be selectively determined by angularly adjusting the supports therefor with respect to the shaft 111. Also, the vertical orientation of the infeed end of the conveyor 36 can be altered by lengthening or shortening the strut 108 (which can be of the usual turn-buckle type) to correlate the infeed end of the conveyor to any particular bag drum 29.

Group-collating section

For convenience of description, the group-collating section will be divided into a group transfer unit and a group turning or collating unit; and in explaining the group transfer unit which will be considered first, particular reference will be made to FIGURES 2, 3, 5 and 9.

As shown best in FIGURE 5, the terminal or discharge end of the conveyor 36 is defined essentially by those end portions of the track members 35 that are located adjacent the collating section 26. At such end of the conveyor, is an L-shaped constraining finger. Considering the constraining finger 113, it is supported for pivotal movement by a pin 114 carried by a support block 115 secured to a transverse bar 117 that is welded or otherwise fixedly secured to the strap composition 109 along the underside thereof. Affixed to the strap composition 109 adjacent its upper end is a bar 117 upon which the track members 35 seat. The bar 117 has secured thereto a pair of supports 118a and 118b that respectively provide journal supports for the shafts of the aforementioned sprockets 42a and 42b.

Figure 7:
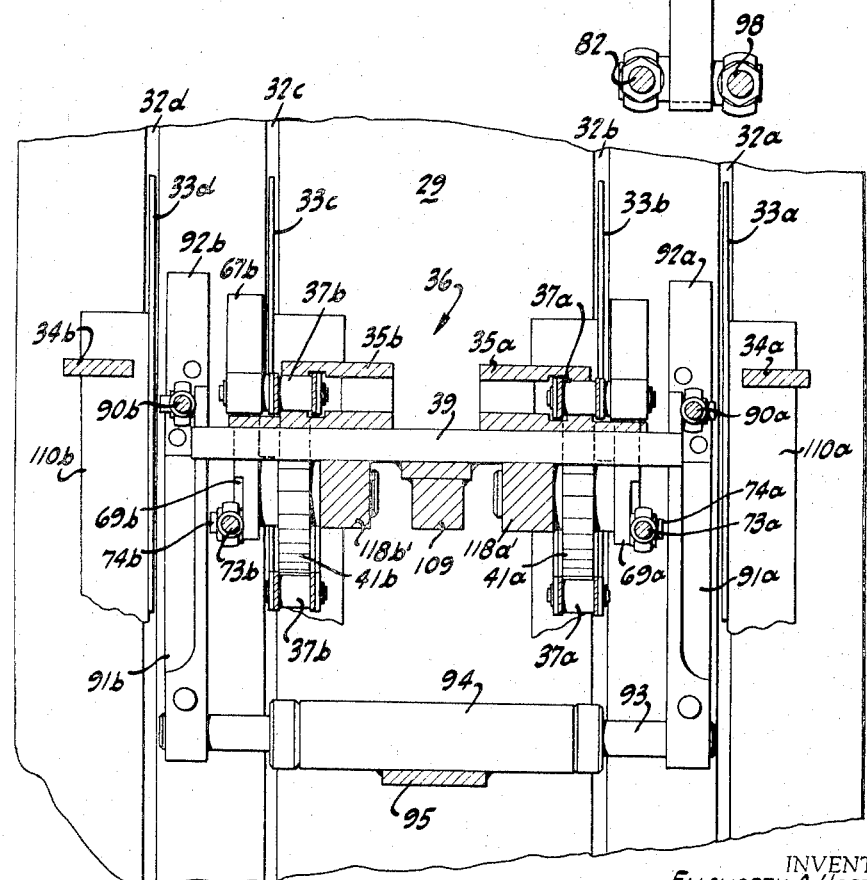
FIGURE 7 is a transverse sectional view taken along the line 7—7 of FIGURE 4.

It may be noted that the shafts of the sprockets 41a and 41b adjacent the opposite end of the conveyor are similarly supported; and referring to FIGURE 7, the two supports are denoted 118a' and 118b' and the transverse bar is designated 39'. Such bar 39' is seen to seat the tracks 35 thereon and, in turn, be secured to the strap composition 109.

The constraining finger 113 is movable between an extended position, shown by full lines in FIGURE 5, in which it projects above the track members 35 and a retracted position, shown by broken lines in such figure, in which it is essentially below the upper surface of the track members. The finger is resiliently biased into the extended position thereof by a helical tension spring 119, and the finger is displaced downwardly against the biasing force of such spring by each group 30 of bags as it is transferred from the conveyor 36 to the turning or collating unit. The function of the restraining finger is to compress slightly the bottom ends of the bags of each leading group as it is advanced to the pick-up station at the end of the conveyor 36 to prevent the bags, or at least some of them, from moving forwardly beyond the terminal ends of the track members 35.

The transfer unit includes a pair of generally L-shaped transfer platforms 120a and 120b (again considering only the platform 120a since the platform 120b and its associated components are duplicates) that are adapted to pick up each group 30 of bags as such group reaches the terminal end of the conveyor 36 and transfer the group into the turning station to be gripped and rotated by the turning unit. The complete path of movement described by each transfer platform 120 is shown best in FIGURE 9, and includes lower starting position shown by full lines in which the platform is located below the conveyor 36, an elevated position directly above such starting position shown by broken lines and for identification denoted by the primed form of the parts number, and a forwardly displaced position also shown by broken lines and denoted with the double primed form of the parts number.

Figure 9:
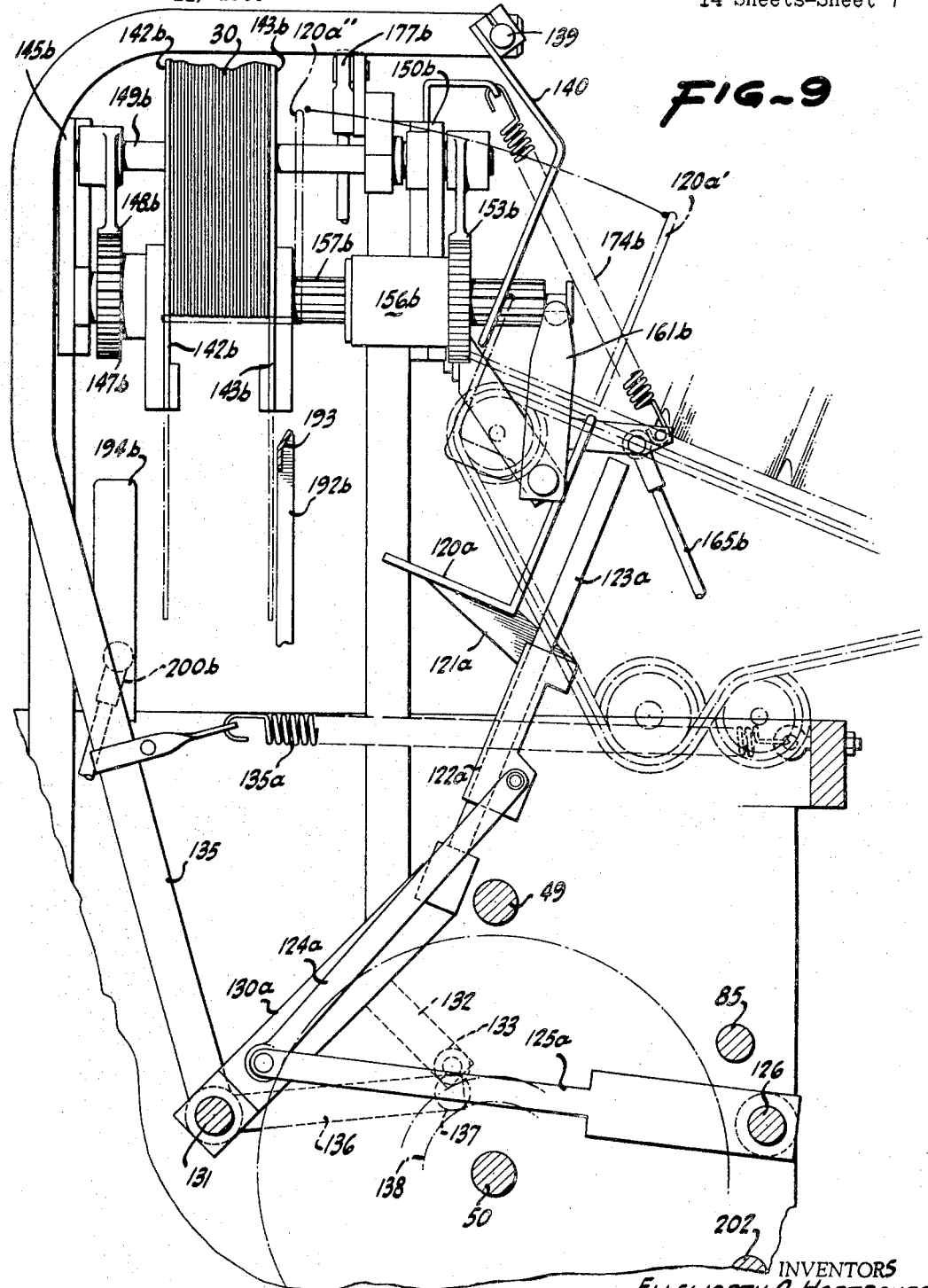
FIGURE 9 is a vertical sectional view generally similar to FIGURE 5, but showing in greater detail the group-collating section of the apparatus.

The transfer platform 120a is rigidly secured to a bracket 121a which is fixedly secured to a tubular collar 122a slidably mounted upon an elongated rod 123a. The tubular collar 122a is reciprocated axially along the rod 123a by a linkage comprising an arm 124a pivotally secured at one end thereof to the collar 122a, and pivotally secured at its other end to a lever 125a. The lever 125a is enlarged adjacent the opposite end thereof and is equipped with a collar or sleeve rotatably supported by a shaft 126 for pivotal movement with respect to the axis thereof (FIGURE 9). The correspondingly enlarged end of the lever 125b is generally T-shaped (FIGURE 5) and has a depending leg 127 equipped at its lower end with a cam follower 128 that rides upon a cam 129.

The cam is configured so as to dispace the lever 125b in angular directions with respect to the axis of the shaft 126 between the retracted position shown by full lines in FIGURE 9 and the extended transfer position illustrated by full lines in FIGURE 5. The cam 129 may be a channel-type cam having a closed track that confines the cam follower 128 therein, whereupon the need for biasing means to urge the cam follower into engagement with the cam surface is obviated. The lever 125b is secured to the aforementioned collar or sleeve and, therefore, displaces concurrently therewith the lever 125a which, as stated, is equipped with such collar.

The transfer platform 120a is also movable between the pick-up and delivery positions respectively denoted in FIGURE 5 (and also denoted in FIGURE 9) by the locations 120a′ and 120a″, and movement between such positions is enforced thereon through displacements of the rod 123a. More particularly, the rod at its lower end is rigidly related to a crank arm 130a that is equipped with a tubular collar or sleeve rotatably supported by a shaft 131 for pivotal movement with respect thereto. The crank arm 130a is generally T-shaped and has a leg 132 equipped with a cam follower 133 that engages a cam 134 which may be of a channel-type construction as described hereinbefore. The cam is rotated by the shaft 50, and is configured so that it angularly reciprocates the crank arm 130a about the shaft 131 to repetitively displace the transfer platform 120a from the pick-up position to the discharge position and then return it to the initial position. The crank arm 130b is secured to such collar or sleeve and therefore moves concurrently with the arm 130a.

Also supported for pivotal movement about the shaft 131 is a bell crank structure in the form of a large arm 135 and a shorter arm 136 extending therefrom at an angle of somewhat more than 90°. The arm 136 at its inner end carries a cam follower 137 that rides on the edge of a cam 138. The cam 138 is rotated by the shaft 50, and is configured so as to displace the arm 135 between the aforementioned pick-up position, in which it cooperates with the transfer platforms 120 to grip a group of bags located thereat, and a delivery position at the turning unit. These two positions of the arm 135 are respectively indicated in FIGURES 9 and 5.

As shown in FIGURES 3 and 9, the arm 135 at its upper end is provided with a transversely extending bar 139, and secured to the bar and extending downwardly therefrom are a pair of clamping arms 140 and 141. The clamp arms 140 and 141 may be bent so that significant lengths thereof are substantially parallel to the upwardly extending portions of the L-shaped transfer platforms 120 as such platforms are moved from the pick-up position to the delivery position. The purpose of such condition of parallelism is to apply to each group 30 of bags over a substantial extent thereof a clamping force developed between the platforms 120, while the group is being supported thereon, and the arms 140 and 141 which, at this time, cooperate with the transfer platforms to hold the group of bags in a somewhat compressed condition as the group is transferred from the pick-up station adjacent the discharge end of the conveyor 36 to the release or delivery position at the turning unit.

In a cycle of operation of the group transfer unit, the components may be taken to have initially the positions shown in full lines in FIGURE 9. At this time, then, the transfer platforms 120 are retracted below the upper surface of the conveyor 36 and the clamping arms 140 and 141 are disposed at the pick-up station and will be in substantial abutment with the leading bag in a group thereof at such station. Accordingly, the clamping arms 140 and 141 are constraining the group against forward displacement along the conveyor 36 even though a displacement force is being imparted to such group by the lugs 67 in engagement therewith, which lugs are being advanced by the moving conveyor chains 37. Consequently, the group of bags will commence to be compressed somewhat. At this time, the constraining fingers 113 are projecting upwardly above the conveyor 36 and tend to cooperate with the clamping arms 140 and 141 in constraining the group of bags against movement.

The cam 129 at about this time commences to dsiplace the leg 127 to reciprocate the tubular collars 122 upwardly along their associated rods 123 to displace the transfer platforms 120 into the pick-up position thereof indicated at 120a′. Such upward movement of the transfer platforms disposes the upwardly extending legs thereof into the space between successive groups 30 of bags, which space is defined by a pair of lugs 67. The base of each transfer platform is brought into engagement with the lower edge of the group of bags and serves to support such group during the actual transfer thereof to the turning unit.

After the platforms 120 are in the elevated pick-up position thereof, the cam 134 commences to displace the crank arms 130 in a counter-clockwise direction, as viewed in FIGURES 5 and 9, about the shaft 131, which displacement has the effect of initiating movement of the transfer platforms 120 toward the delivery position thereof denoted in FIGURE 9 as 120a″. Substantially concurrently with the initiation of such displacement of the transfer platforms 120 toward the delivery position, but perhaps slightly thereafter to permit some compressional clamping of the group of bags supported on the platforms, the cam 138 commences to displace the arm 136 (in a counter-clockwise direction as viewed in FIGURE 9) with respect to the shaft 131 to displace the arm 135 and clamping arms 140 and 141 carried thereby toward the delivery position. Evidently, after concurrent movement of the transfer platforms 120 and clamping arms 140 and 141 begins, these components will be advanced simultaneously at essentially the same angular velocities to transfer a group of bags engaged thereby into the delivery position in a slightly compressed condition.

After such group of bags has been displaced into the delivery position and has been gripped by the turning units, as will be described hereinafter, the cam 129 retracts the transfer platforms 120 into a lowered position to enable them to be returned to a location below the conveyor 36, as shown by full lines in FIGURE 9. Such return movement of the retracted transfer platforms is enforced thereon by the cam 134 which causes the crank arms 130 to be angularly displaced in a clockwise direction with respect to the shaft 131. After the group of bags at the delivery station has been rotated or turned downwardly (which downward movement thereof withdraws the group from juxtaposition with the clamping arms 140 and 141), the cam 138 causes the arm 135 to be angularly displaced in a clockwise direction, as viewed in FIGURES 5 and 9, about the shaft 131 to return the clamping arms to the pick-up position thereof shown by full lines in FIGURE 9.

Thus, a cycle of operation has been completed, and such cycle will be repeated for each group 30 of bags advanced into the pick-up station adjacent the terminal end of the conveyor 36. It may be noted, as shown in FIGURE 5, that displacement of the bag group from the pick-up station toward the discharge station will cause such group to ride over the constraining finger 113 and depress it downdardly into the position thereof shown by broken lines in FIGURE 5. As soon as the group of bags passes over the finger 113, it will be snapped back into the extended, full-line position thereof shown in FIGURE 5 because of the biasing force imparted thereto by the spring 119.

With respect to the group turning or collating unit which will now be described, particular reference will be made to FIGURES 2, 3, 5 and 9 through 11.

The turning or collating unit is essentially symmetrical about the longitudinal center line of the apparatus, and comprises two subunits or subassemblies one of which rotates alternate groups of bags in one angular direction and the other of which rotates the respectively interposed groups of bags in the opposite angular direction. Accordingly, the subunits differ one from the other in their directions of rotation, but apart therefrom no esential difference exists between the two. Therefore, to simplify the detailed description, the explanation will be directed for the most part to but one of the subunits, and because the drawings best illustrating a subunit show the one located on the left-hand side of the apparatus, as viewed in FIGURE 3, the suffix b will be added to each of the numerical designations applied to the parts thereof to make the use of suffixes consistent throughout. Accordingly, the respectively corresponding components of the other subunit will be denoted with the same numerical designations, except that the suffix a will be used.

Figure 10:
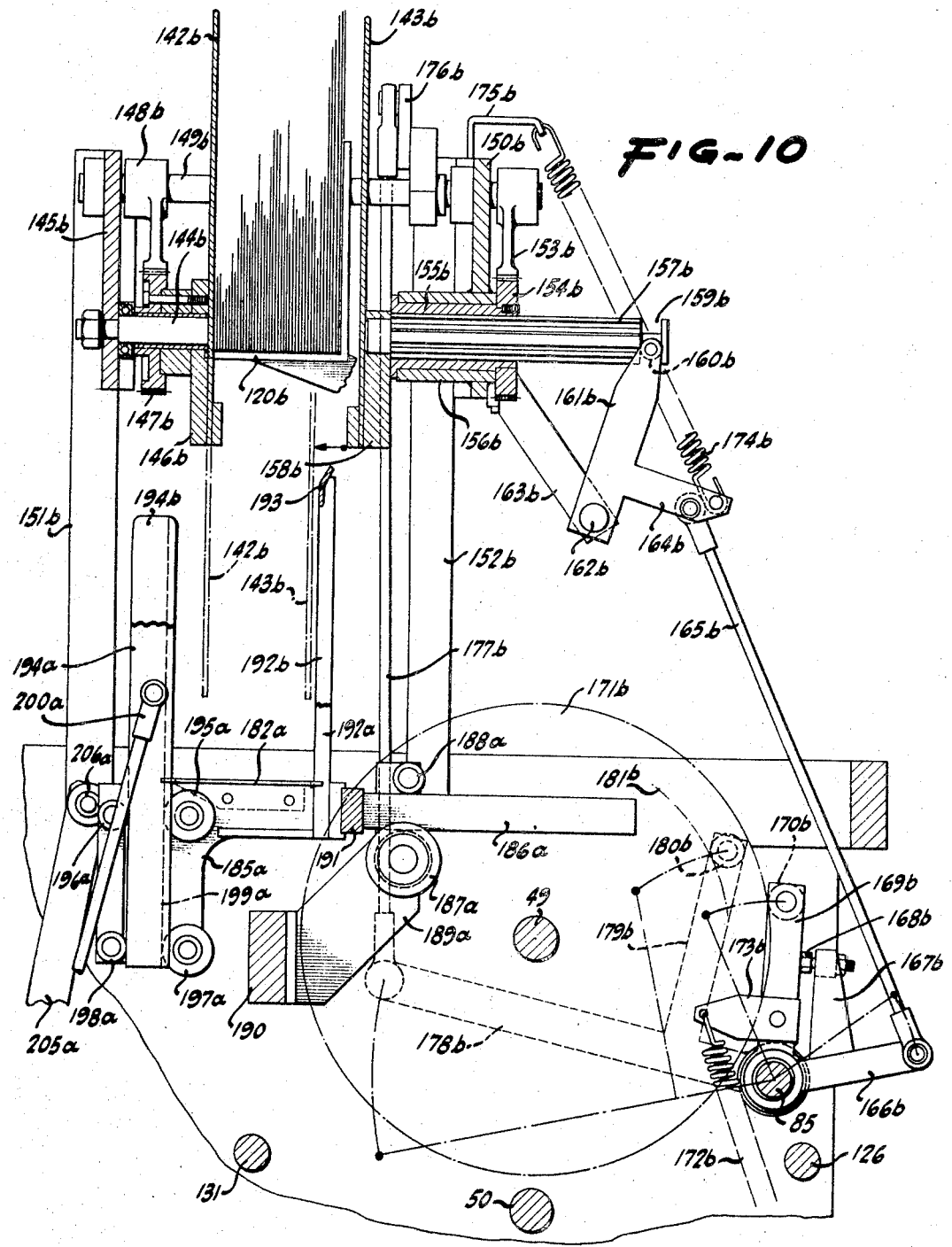
FIGURE 10 is a vertical sectional view generally similar to that of FIGURE 9, but illustrating many of the components in section to show the structural characteristics thereof.

As shown most clearly in FIGURE 10, one such subunit includes a pair of turning plates 142b and 143b movable concurrently between the aforementioned delivery or group-gripping station (as shown by full lines in FIGURE 10) and a release or discharge station shown by broken lines in this figure. Quite evidently, the turning plates must also move relative to each other between open and closed positions at both the gripping station and release station in order to grip and control a group 30 of bags transferred into the gripping station by the transfer platforms 120 and to release such group after it has been turned or collated.

In this latter respect, the plate 142b is rotatable but is not otherwise displaceable, and it is supported upon a stub shaft 144b journalled for rotation in bearing structure supported by a frame plate 145b. More particularly, the plate 142b has a mounting block 146b welded or otherwise rigidly secured thereto which is rotatably carried by the stub shaft 144b, as shown in FIGURE 10. Also carried by the shaft 144b is a spur gear 147b. The gear and mounting block are separated by a spacer but are rigidly secured together by a plurality of cap screws. Accordingly, the plate 142b is connected with with the gear 147b and must rotate therewith, and the entire group of components 142b, 146b and 147b are rotatable with respect to the shaft.

Meshingly engaged with the spur gear 147b is a sector gear 148b splined or otherwise secured to a drive shaft 149b so as to rotate therewith. The shaft 149b is supported for rotation adjacent the opposite ends thereof in the frame plate 145b and in a support bracket 150b. The plate 145b and bracket 150b are respectively secured to uprights 151b and 152b which comprise a part of the main frame structure of the apparatus. The shaft 149b has a sector gear 153b clamped thereto, and the sector gear meshes with a spur gear 154b secured to a bearing sleeve 155b, as by means of set screws, and the bearing sleeve is rotatably supported by a tubular collar 156b welded or otherwise rigidly secured to the support bracket 150b.

The tubular bearing 155b has a splined passage therethrough that slidably receives therein a correspondingly splined shaft 157b reciprocable along the longitudinal axis thereof relative to the tubular bearing but necessarily rotatable therewith. At its inner end, the shaft 157b is fixedly secured to a mounting block 158b welded or otherwise rigidly related to the plate 143b and carrying the same. The shaft 157b and mounting block 158b may be fixedly interconnected by set screws, a press fit, or otherwise, to rigidly interconnect the same. Adjacent its outer end, the shaft 157b is providde with a radially disposed, circumferential channel or recess 159b that receives therein a drive roller 160b supported at one end of a somewhat T-shaped arm 161b.

Adjacent its opposite end, the arm 161b is supported for pivotal movement about a pin 162b carried by a fixed strap 163b rigidly related to the frame upright 152b. The leg 164b of the arm is pivotally connected to one end of an elongated push rod 165b that at its other end is pivotally connected to a crank arm 166b equipped with a tubular collar or sleeve supported for pivotal displacements relative to the longitudinal axis of the aforementioned shaft 85. The crank arm 166b is equipped with an upwardly extending bracket or carrier 167b that provides a mounting for an adjustable abutment 168b in the form of a screw aligned with and adapted to be engaged by a cam follower arm 169b supported for angular displacements with respect to the shaft 85 independently of the arm 166b. The cam follower arm 169b at the end thereof is provided with a cam follower 170b that ridingly engages a cam indicated diagrammatically in FIGURE 10 and denoted with the numeral 171b. The cam 171b is mounted upon the aforementioned shaft 49 and is rotatably driven thereby.

The cam follower 170b is resiliently biased into engagement with the cam 171b by a helical tension spring 172b which is connected at one end to a fastener link 173b carried by the cam follower arm 169b. At its other end, the spring is fastened to a stationary connector. The abutment element 168b is resiliently biased into engagement with the cam follower arm 169b by a helical tension spring which, at one end thereof, is connected to the leg 164b of the T-shaped arm 161b, and at its other end is connected to a fixed fastener 175b secured to the frame structure of the apparatus.

The resilient interconnection thus defined between the cam follower arm and the abutment permits relative movement therebetween which enables the turning plates 142b and 143b to accommodate bag groups 30 of somewhat different thicknesses (i.e., a slightly different bag count) while resiliently gripping any such bag group 30. It will be evident that the spring 174b biases the T-shaped arm 161b in a counter-clockwise direction, as viewed in FIGURE 10, about the pin 162b thereby urging the splined shaft 157b inwardly or toward the left so that the turning arm 143b is resiliently urged toward the closed or group-gripping position thereof.

As the cam 171b is rotated, the cam follower arm 169b is displaced inwardly and outwardly. As it is displaced inwardly toward the innermost position thereof, the tension spring 174b urges the splined shaft 157b inwardly so that the abutment 168b tends to remain in engagement with the follower arm 169b. However, as soon as the turning plate 143b engages a bag group 30, which engagement ultimately terminates such displacement of the arm, the abutment 168b is constrained against further movement and the follower arm 169b may move inwardly and away from the abutment. As the cam 171b commences to return the arm 169b to the outer position thereof shown in FIGURE 10, the abutment 168b is engaged by the follower arm, whereupon the rod 165b is displaced downwardly to pivot the T-shaped arm 161b in a clockwise direction and thereby return the splined shaft 157b to the outermost position thereof, as shown in FIGURE 10.

Rotational displacements are imparted to the plates 142b and 143b to turn the same from the uppermost group-gripping position thereof, shown in FIGURE 10 in full lines, into the lower position, illustrated by broken lines, by the mechanism now to be described. Such mechanism includes a crank 176b fixedly secured to the drive shaft 149b so that relative rotation therebetween is prevented. Pivotally secured at one end to the crank 176b is an elongated push rod 177b which, at its other end, is pivotally secured to a crank 178b mounted for pivotal movement with respect to the axis of the shaft 85.

The crank 178b is provided with a laterally extending leg 179b equipped at an end thereof with a cam follower 180b. The cam follower rides in a channel-type cam generally indicated in FIGURE 10 and denoted with the numeral 181b. The cam is mounted upon the shaft 49 so as to rotate therewith and, evidently, the cam is configurated so as to pivotally displace the crank 178b in clockwise and counter-clockwise directions, as viewed in FIGURE 10, about the axis of the shaft 85. Such angular displacements of the crank will reciprocate the push rod 177b along the longitudinal axis thereof (between the upper position shown and a lower position) and, as a consequence, the drive shaft 149b will be angularly displaced alternately in opposite directions because of the connection of the push rod with the drive shaft through the crank 176b.

Such movements of the drive shaft 149b will concurrently displace the sector gears 148b and 153b, whereupon the spur gears 147b and 154b respectively engaged therewith will be angularly displaced to pivot the respectively associated plates 142b and 143b. The plate 143b can be reciprocated toward and away from the plate 142b as well as being rotated concurrently therewith because of the sliding interconnection defined between the splined shaft 157b and the correspondingly splined bearing sleeve 155b through which the shaft passes.

Figure 11:
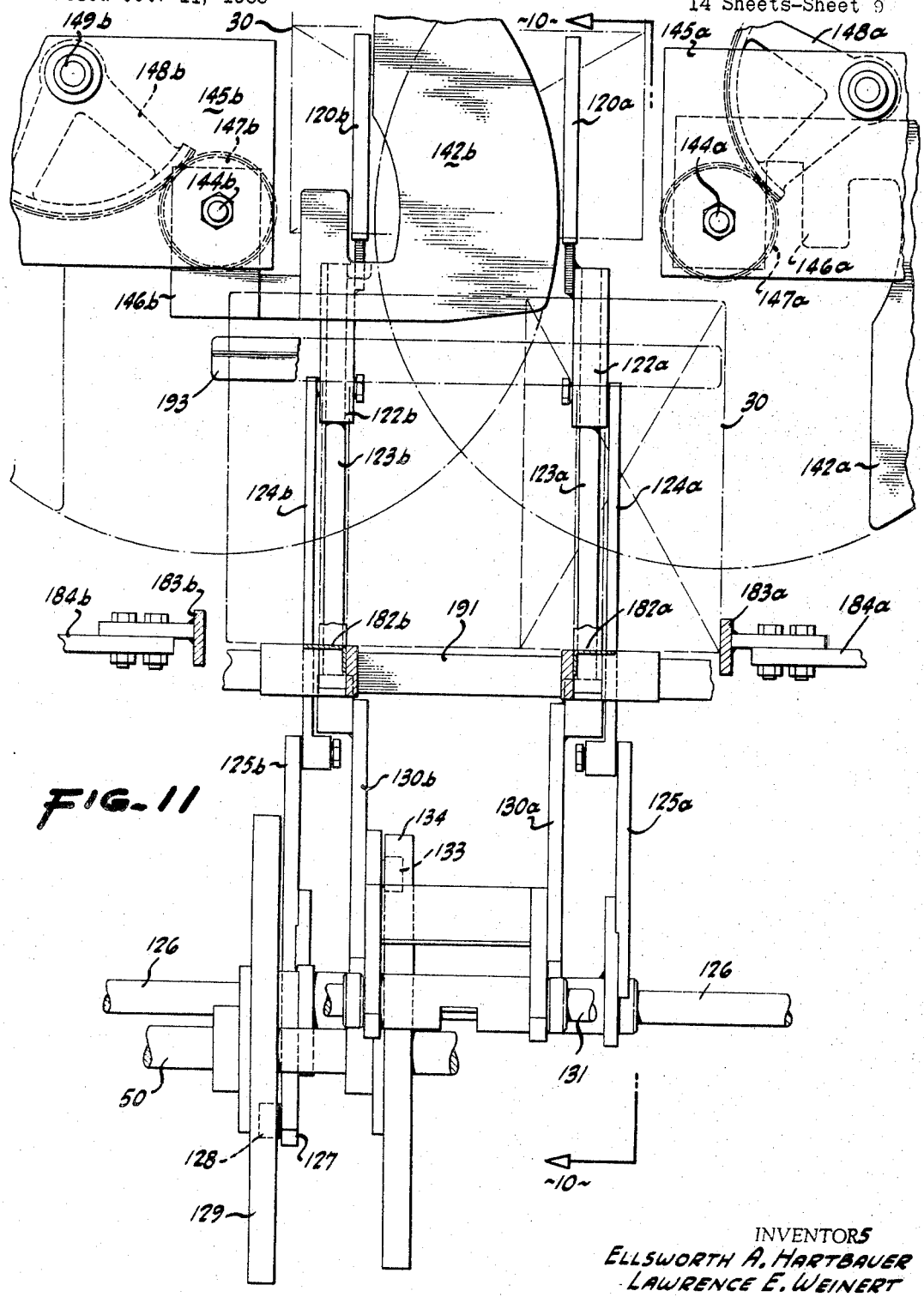
FIGURE 11 is an enlarged, transverse sectional view illustrating certain features of the group-collating section.

As has been brought out hereinbefore, the function of the plates 142b and 143b and their counterparts 142a and 143a is to grip a group 30 of bags advanced by the transfer platforms 120a and 120b into the turning station, and to rotate such group of bags through substantially 90° in one or the other angular directions, depending upon which pair of plates grips the bag group, to deposit the turned group of bags on a platform defined by a pair of inverted L-shaped channels or rails 182a and 182b (FIGURE 11). The rails 182a and 182b are spaced apart transversely so as to define a stable support for each bag group deposited thereon.

Respectively extending along the rails 182a and 182b, but spaced laterally outwardly therefrom, are a pair of stops or abutments 183a and 183b—the spacing between which is somewhat greater than the length of the bags constituting any group 30 thereof. The stops 183 are longitudinally extending and exceed in length the maximum thickness of any group 30, as seen best in FIGURES 14 and 15. The stops 183a and 183b are respectively mounted upon support bars 184a and 184b that rigidly relate the stops to the main frame structure of the apparatus. Adjustability, in a transverse sense, is provided for the stops 183 by the elongated slot and cap screw mounting means as seen in FIGURE 15.

In describing a cycle of operation of the two pairs of plates 142–143 in collating two successive groups 30 of bags, all of the plates first may be taken to be in the lowermost position thereof, as shown by the plates 142a and 143a in FIGURES 2 and 11. In such position of the plates, the group-gripping station is open so that a group 30 of bags can be transferred thereinto by the transfer platforms 120a and 120b. Further, the plates in such position thereof will be remote from the discharge station defined by the rails 182 and stops 183. Accordingly, any previously deposited group of bags can be advanced from such discharge station. Additionally, the plates will be open so that each of the plates 143 should be in its most remote position relative to the associated plate 142 as shown, for example, in FIGURE 2 by the plates 142a and 143a and in FIGURE 10 by the plates 142b and 143b.

Assume that the transfer mechanism comprising the platforms 120 and clamping arms 140 and 141 has advanced a bag group 30 into the gripping station, as shown in FIGURE 2 and as heretofore described. It will be the turn of either one or the other of the paired plates 142–143 to be rotated upwardly and into a position for gripping such group of bags, and for purposes of this discussion, it will be assumed that the plates 142b and 143b are to be swung upwardly. In this event, the cam 181b will be in a position in which the cam follower 180b is in the innermost position thereof and is about to be displaced outwardly by the cam and into the outer position indicated in FIGURE 10, as the cam continues to be rotated by the shaft 49. Such outward displacement of the cam follower 180b will cause the crank 178b to pivot in a clockwise direction, as seen in FIGURE 10, relative to the axis of the shaft 85. As a consequence, the two plates 142b and 143b will be swung upwardly into the position thereof shown by full lines in FIGURE 10. During this upward movement, the plates will be open so that they readily receive the bag group 30 therebetween which is held in a somewhat compressed condition by the clamping arms 140 and 141 in cooperation with the transfer platforms 120.

Next, the turning plate 143b is displaced toward the plate 142b by action of the cam 171b and cam follower 170b, as heretofore described, and such displacement continues until the bag group 30 is firmly gripped between the two plates 142b and 143b and is further compressed thereby. The condition of the various elements following this occurrence is illustrated in FIGURE 2, and it will be noted in such figure that the plate 143b has been displaced toward the plate 142b to a position past the upright legs of the transfer platforms 120. The transfer platforms are then lowered and returned to the pick-up station thereof, as described hereinbefore, and the clamping arms 140 and 141 may be withdrawn slightly from the bag group so as to enable the plate 142b to move downwardly therepast.

Immediately, the plates 142b and 143b commence to be displaced in a clockwise direction, as viewed in FIGURE 11, to rotate or turn the group of bags gripped thereby through an arcuate distance of approximately 90° preparatory to releasing the same on the platform defined by the rails 182. As the plates swing downwardly, and somewhat before they have traversed an angular distance of 90°, the plate 143b begins to be withdrawn from the plate 142b to release the grip on the bag group 30. The timing is such that the bag group is substantially free of any gripping action by the plates at the time that the group has traversed the entire angular distance of 90°. The momentum imparted to the group of bags may be sufficient to carry it into substantial abutment with the stop 183b, which condition of abutment is best shown in FIGURES 11 and 14 as between a group of bags and the stop 183a. The plates 142b and 143b continue along their path of arcuate movement until they are completely withdrawn from the group of bags and are located laterally outwardly from the stop 183b so that the discharged group of bags can be advanced from the discharge station.

The functional sequence described is next carried on with the plates 142a and 143a in precisely the same manner, and such plates will be effective to rotate the group of bags gripped thereby in an opposite angular direction through a similar arcuate distance of substantially 90°. The timing relationship as between the two sets of plates 142a–143a and 142b–143b may be thought of as being about 180° out of phase so that such sets alternate in their processing of bag groups. Thus, any two successively turned or collated bag groups will be oriented in opposite directions and, in particular, the bottoms thereof will be oppositely oriented.

In this latter respect, it may be noted that the closed bottoms of the bags are, in each instance, rotated toward one or the other of the stops 183 and, should impact occur with such stops, it will be the bottom closed ends of the bags that impact thereagainst. This feature is desirable since, quite apparently, the closed bag end is much stronger than the open upper end because of the additional paper thickness and because of the seams or folds therein.

After each set of plates 142–143 has turned or collated one group of bags, a completed cycle of operation will have been consummated and the apparatus will be in condition for a subsequent cycle. It may be noted that because of the inclusion of two pairs of turning plates 142–143 which are alternately operative, one complete cycle of operation is not effected until each pair of plates has performed a turning operation. Consequently, the shaft 49 which drives the control cams 171 and 181 rotates at one-half the angular velocity of the shaft 50 upon which are mounted the cams controlling the other operations performed by the apparatus.

*Group assembly section*

For convenience of description, the group assembly section will be divided in a group-advancing unit and a bag aligning unit; and in explaining the group-advancing unit which will be considered first, particular reference will be made to FIGURES 2, 3, 10, 12 and 13.

Evidently, it is necessary to advance each group of bags after it has been rotated by one or the other of the pairs of plates 142–143 and deposited onto the discharge platform defined by the rails 182. Accordingly, the group-advancing unit must function at an operational speed to accomplish this result; and in the present apparatus, the advancing unit is cyclically repetitive in its operation and engages a group of bags deposited by the turning plates, advances such group from the discharge station and then returns to its starting position in preparation for the next cycle of operation. The aforementioned platform defined by the tracks 182 is also a part of the advancing unit in that such platform is displaceable between the group-receiving discharge position thereof, shown by full lines in FIGURES 10 and 12, and a release position advanced therefrom, as shown by broken lines in FIGURE 12 and full lines in FIGURE 13.

Figure 12:
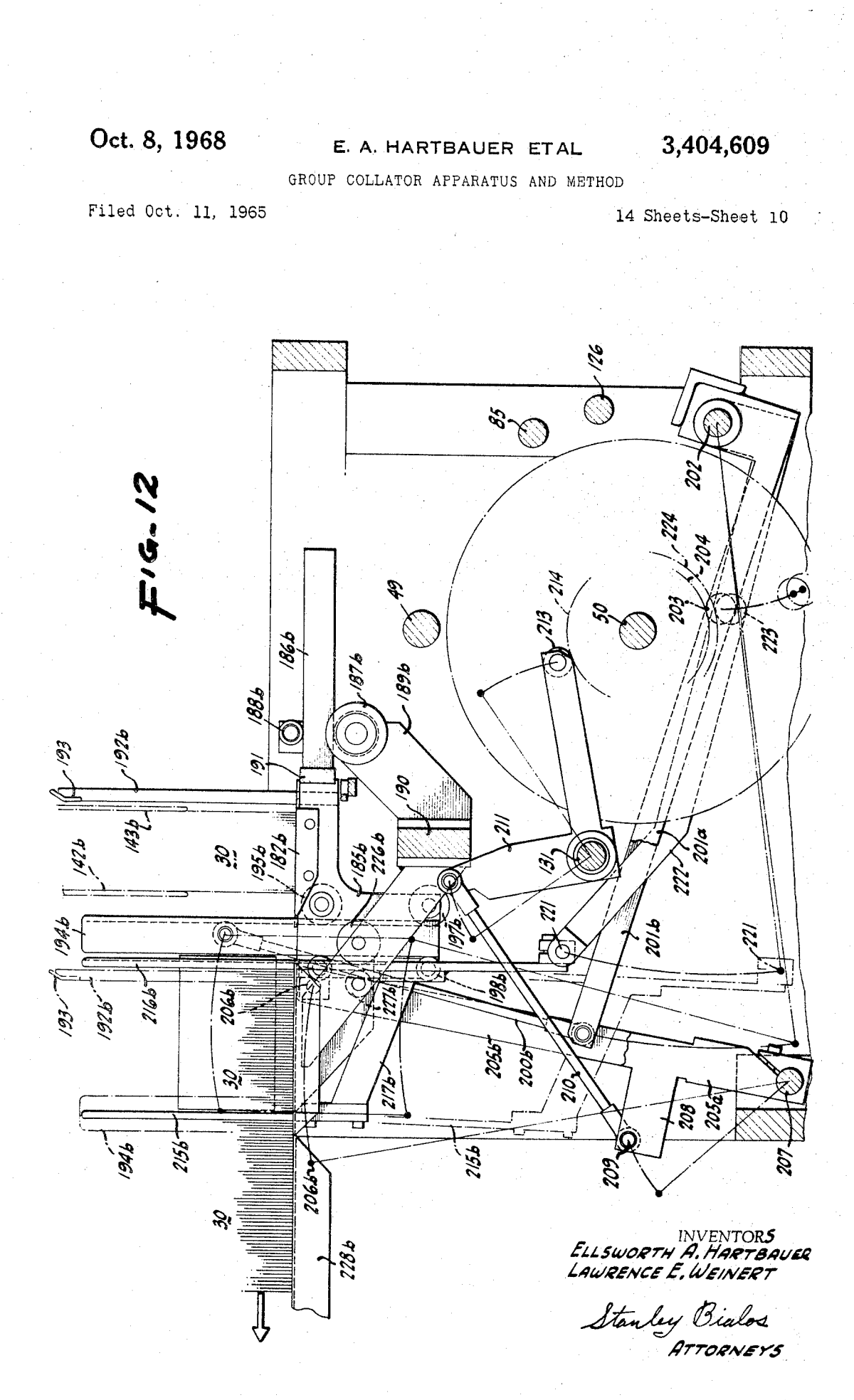

The structural composition defining the advancing unit is for the most part symmetrical about the longitudinal center line of the apparatus, and for this reason, the suffixes *a* and *b* will be used in the numerical description, as in the prior description, to differentiate between the two sides of the apparatus. Referring to FIGURES 10 and 12 in particular, it is seen that the track 182a is bolted or otherwise rigidly secured to a carriage 185a formed integrally with or otherwise equipped with a longitudinally extending guide bar 186a supported for reciprocable displacements by a pair of rollers 187a and 188a respectively engaging the lower and upper edges of the bar. The rollers are rotatably supported upon a bracket 189a secured to the main frame structure of the apparatus, as indicated by the transversely oriented bar 190. It may be noted that the two carriages 185a and 185b are interconnected and mechanically related to each other by a transversely extending bar 191.

The carriage 185a is provided with an upwardly extending pusher 192a rigidly related thereto so as to be displaceable therewith. The two pushers 192 are interconnected adjacent their upper ends by a transversely oriented pusher strap 193. Also mounted upon the carriage, so as to move longitudinally therewith, is a support finger or holder 194a. The holder is much greater in thickness along the longitudinal axis of the apparatus than the pusher 192a and it is spaced forwardly therefrom by a distance sufficient to readily accommodate a group 30 of bags rotated downwardly therebetween by the turning plates 142–143, as indicated in both FIGURES 10 and 12.

The finger 194a is vertically reciprocable with respect to the carriage 185a and, accordingly, is supported thereby for reciprocable displacements with respect thereto. The support means includes two pairs of vertically spaced rollers respectively identified with the numerals 195a–196a and 197a–198a. The rollers 195a and 197a are larger than the rollers respectively paired therewith and ride within a channel 199a formed in the finger 194a along one edge thereof. The rollers 196a and 198a engage the opposite edge of the finger. The defined interrelationship of the finger 194a with the various rollers enables the finger to be reciprocated in a vertical direction, but constrains the same against movements relative to the carriage 185a in both longitudinal and transverse directions.

Reciprocable displacements are imparted to the finger 194a by actuator mechanism including a push rod 200a pivotally connected adjacent one end thereof to the finger, and pivotally connected adjacent the opposite end thereof to a crank arm 201a (see the interconnection of the rod 200b and crank arm 201b in FIGURE 12) equipped with a tubular collar or sleeve supported for pivotal displacements with respect to a shaft 202 extending across the apparatus. The crank arm 201a is equipped intermediate the ends thereof with a cam follower 203 that ridingly engages a cam indicated diagrammatically in FIGURE 12 and denoted with the numeral 204. The cam is mounted upon the aforementioned shaft 50 and is rotatably driven thereby; and is configured to reciprocate the crank arm 201a in a counter-clockwise direction, as viewed in FIGURE 12, thereby to displace the finger 194a downwardly from the elevated position thereof, shown in FIGURE 12, to a lower position (indicated by the paths of movement in both FIGURES 12 and 13) in which it is retracted below the upper surface of the track 182a to enable the carriage 185a to be slideably withdrawn from beneath a group 30 of bags disposed thereabove to return the carriage from the position thereof shown in FIGURE 13 to the starting position thereof illustrated in FIGURE 12.

The carriage 185a is cyclically displaced between the group-receiving and group-release stations thereof by a mechanism including an upwardly extending strut 205a pivotally secured adjacent its upper end by a pin 206a (FIGURE 10) to the carriage 185a forwardly of the roller 196a thereof. Adjacent its lower end, the strut 205a (FIGURE 12) is clamped to a shaft 207 extending transversely of the apparatus and supported by the frame structure thereof for pivotal displacements. Evidently, the strut 205a supports the carriage 185a adjacent the forward end thereof and, in this respect, cooperates with the guide bar 186a and rollers 187a and 188a.

Intermediate its ends, the strut 205a is equipped with a forwardly extending bracket 208 pivotally connected by a pin 209 with one end of a push rod 210 which, at its other end, is pivotally secured to one leg of a bell crank 211 equipped with a tubular collar or sleeve supported for pivotal movement on the aforementioned shaft 131. The other leg of the bell crank is provided with a cam follower 213 that cooperates with a cam diagrammatically illustrated in FIGURE 12 and denoted as 214. The cam 214 is configurated so that as it is rotatably driven by the shaft 50, it angularly reciprocates the bell crank 211 about the shaft 131, whereupon the strut 205a is angularly reciprocated between the group-receiving position of the carriage 185a, as shown in FIGURE 12, and the group-release station of the carriage illustrated in FIGURE 13. The carriage 185b is similarly reciprocated because the strut 205b thereof is clamped to the shaft 207.

The carriage 185a must release each group of bags advanced thereby into the position shown in FIGURE 13 in order that it be in condition for accepting a subsequent group of bags at the group-receiving station. For this result to be accomplished, it is necessary to constrain each group of bags at the release station to enable the carriage to be withdrawn from beneath the bag group. The constraining structure used for this purpose (see FIGURE 13) includes front and rear fingers 215a and 216a fixedly secured to a support strap 217a therefor. The finger 216a is elongated and extends downwardly past the strap 217a, and at its lower end is pivotally connected by a pin 221 to a crank arm 222 supported for pivotal movement by the aforementioned shaft 202. The crank arm 222 intermediate the ends thereof is equipped with a cam follower 223 that ridingly engages a cam indicated diagrammatically in FIGURE 12 and denoted with the numeral 224.

The cam 224 is driven by the shaft 50, and it is configurated so as to reciprocate the crank arm 222 with respect to the shaft 202 and thereby raise and lower the longitudinally spaced fingers 215a and 216a between the elevated, group-restraining position thereof shown by full lines in FIGURE 12, and the retracted position thereof illustrated in FIGURE 13 in which they are located below the bottom edge of the bag groups 30. The rear finger 216a has a longitudinally extending channel or recess 225a formed therein, and a roller 226a is received within such channel and constrains the finger against transverse displacements. The roller 226a, in cooperation with a roller 227a which also engages the finger 216a, constrains the finger against longitudinal and transverse displacements.

A cycle of operation of the group-advancing unit will now be described, and the various components may be assumed initially to have the relative positions shown by full lines in FIGURE 12. Thus, the carriages 185 are in the group-receiving position thereof, the holder fingers 194 will be extended above the platform defined by the tracks 182, and the fingers 215 and 216 will be in their retracted position since at this time it is unnecessary for them to hold the prior group 30 of bags which were displaced from the group-receiving station by the advancing unit.

The plates 142a and 143a (or their counterparts 142b and 143b) rotate a group 30 of bags downwardly into the space defined between the pushers 192 and holder fingers 194 and release such group of bags as they continue to rotate to a location beyond the stop 183a so as to be completely out of the path of movement of the pushers 192. The group of bags spreads slightly after being released by the turning plates and will substantially fill the entire space defined between the pushers 192 and holder fingers 194. Next, the carriages 185 will commence to be advanced by action of the cam 214, follower 213, bell crank 211, push rod 210, shaft 207 and struts 205, as heretofore described. The condition of the apparatus following such initiation of movement of the carriage is illustrated in FIGURE 2 wherein it can be seen that the pushers 192 have advanced forwardly past the rear turning plates 143 and, in a similar manner, the holder fingers 194 have advanced past the forward turning plates 142.

At this time, and prior to the carriages 185 being advanced toward the release position thereof illustrated in FIGURE 13, the fingers 215 and 216 must be completely displaced downwardly to open the path of movement for the pushers 192, holder fingers 194, and the group 30 of bags confined therebetween. This downward displacement of the fingers 215 and 216 is effected in the manner described heretofore through operation of the cam 224 and associated follower 223, and commences at about the same time that the holder fingers 194 are displaced upwardly into the extended position thereof shown in both FIGURES 12 and 13. That particular phase of the cycle of operation will be considered further in elaborating the return motion of the carriages 185.

Evidently, forward displacement of the carriages 185 will not only advance a bag group 30 positioned forwardly of the pushers 192, but it will also advance whatever bag groups are located forwardly of the holder fingers 194 which usually will include the bag group advanced by the carriages in the immediately prior cycle of operation and also any bag groups that may happen to be located forwardly thereof. That is to say, while any suitable conveyor means could be associated with the apparatus so as to further advance or remove bag groups as they are released by the group-advancing unit, in the particular apparatus shown, a stationary support platform defined by transversely spaced rail members 228a and 228b is provided so that any advancement of the bag groups therealong is caused by the holder fingers 194.

Such forward displacement of the carriages continues until the unit is in the release position thereof, shown in FIGURE 13, and it can be seen that the fingers 215 and 216 are in their lowermost retracted condition as the carriages 185 reach the terminal position. In such terminal position thereof, the holder fingers 194 are in substantially vertical alignment with the forward fingers 215, and since the holder fingers are much wider than the fingers 215, the latter are readily movable upwardly into the space defined by the holder fingers 194 between the two successive bag groups 30. Similarly, the pushers 192 and fingers 216 are in general vertical alignment, although the fingers 216 are located slightly rearwardly of the pushers. Accordingly, there is nothing to interfere with free upward movement of the fingers 216.

Next, the cam 204 is in a condition to initiate downward displacement of the holder fingers 194 and, at essentially the same time, the cam 224 is in a condition to initiate upward displacement of the fingers 215 and 216. Accordingly, at about the time that the holder fingers 194 are completely retracted, the fingers 215 and 216 are completely extended and are thereby effective to constrain the advanced bag group 30 against displacements in either longitudinal direction along the apparatus. The fingers 215 and 216 are located inwardly of the pushers 192 and holder fingers 194, and in no way interfere with rearward displacement of the carriages 185 and pushers 192 thereof as these components are returned to the group receiving position shown in FIGURE 12. It will be recalled that during such return movement, the holder fingers 194 are retracted and are therefore located below the platform defined by the tracks 182.

Return motion is imparted to the carriages 185 by the cam 214, and after the carriages have been returned to the group-receiving position thereof, the cam 204 commences upward displacement of the holder fingers 194 toward their extended position. At about the same time, the fingers 215 and 216 are being retracted by operation of the cam 224. Therefore, once the fingers 215 and 216 have been retracted and the holder fingers 194 extended, the apparatus is in condition for the initiation of another cycle of operation.

With respect to the bag aligning unit which will now be described, particular reference will be made to FIGURES 3, 14, 15 and 16.

As explained earlier, it is desired to provide a positive arrangement for aligning the bags in each group both transversely and vertically, and to insure such alignment of the bags in successive groups thereof. Relatively accurate alignment is desired because the collated bag groups are finally arranged in bundles which are usually banded. Clearly, if the bags were permitted to assume random positions with respect to others in their group, any bundle constituting a plurality of groups would be difficult to handle in banding machinery, and it would also result in unsightly bundles not easily stored and shipped. In the present apparatus, means are included for aligning the bags transversely of the apparatus (i.e., along their longitudinal axes) and also for aligning the same vertically.

Referring first to FIGURE 14, it is seen that a group of bags transferred by the turning plates 142a and 143a have the bottom ends thereof disposed in substantial abutment with the stop 183a. In that the distance defined between the two stops 183a and 183b is greater than the length of each bag, such bags for the most part will have the open upper ends thereof spaced a substantial distance from the stop 183b. However, after the turning or collating displacement of the bag group 30, all of the bags comprised thereby may not be in abutment with the stop 183a and there is no assurance that accurate transverse alignment will occur. Similarly, there is no assurance that the bags in such group will be aligned vertically. In an identical sense, a group of bags processed by the plates 142b and 143b will have the bottoms thereof in substantial abutment with the stop 183b at the termination of the turning operation. However, any such group may also have misaligned bags, as described.

Forwardly of the stops 183a and 183b are located a pair of displacement-imparting devices or transverse joggers 229a and 229b that are transversely displaceable, as indicated by the arrows in FIGURE 14. The displacement devices 229 in the outermost positions thereof define a maximum space therebetween which approximates the space defined between the stops 183, and in their innermost positions, the devices 229 define a space determined by the length of the bags. That is to say, a resilient inward force is applied to at least one of the devices 229 so that relative inward movement of the two devices toward each other is terminated by abutment thereof with the bag group. This feature will become evident hereinafter.

It will be appreciated that each group 30 of bags that initially engages, at the closed ends thereof, one or the other of the stops 183 will be forced inwardly by the displacement devices 229 and will be confined to longitudinal movement along a restricted path. At the same time, the repetitive or vibrationary impact forces imparted by the devices 229 to a bag group will be effective to bring about a condition of transverse alignment among the various bags thereof. It may be noted that for the most part, such alignment-producing impact forces will be delivered to the closed ends of the bags which, in being stronger, are much better able to withstand such impact forces without danger of the bags being damaged thereby.

Referring to FIGURES 15 and 16, it is seen that the devices 229 are respectively affixed through posts 230a and 230b to actuator arms 231a and 231b that are respectively supported for angular displacements along horizontal paths by pins 232a and 232b to which they are secured. The pins are respectively journalled for rotational displacements in support collars 233a and 233b that are carried by the frame structure of the apparatus. The two actuator arms 231 are resiliently biased inwardly toward each other by a helical tension sprin 234 secured at opposite ends thereof to the arms. Clamped to the pin 232b and extending inwardly therefrom is a lever 235 tending post 236. In a somewhat analogous manner, the apparatus and is equipped thereat with an upwardly extending post 236. In a somewhat analogous manner, the pin 232a has clamped thereto an inwardly extending lever 237 that also terminates adjacent the center line of the apparatus in spaced relation with the lever 235 but which is equipped with an abutment finger 238 extending inwardly past the post 236 so as to engage the same.

A helical tension spring 239, secured at one end to the frame structure of the apparatus and at its other end to the lever 237 by means of a stud 240 carried thereby, serves to resiliently bias the lever 237 in a clockwise direction, as viewed in FIGURE 15, with respect to the axis of the pin 232a so as to maintain the finger 238 in substantial engagement with the post 236. Fixedly secured to the pin 232b so as to prevent relative angular displacements therebetween is a crank arm 241 which, at its opposite end, is pivotally connected to a link 242 that is pivotally connected with one leg of a bell crank 243. The bell crank is equipped intermediate the ends thereof with a tubular collar or sleeve supported for pivotal displacements about the aforementioned shaft 131. The other leg of the bell crank carries a cam follower 244 that engages the cam-configured surface 246 of a cam 247 supported for rotation on the aforementioned shaft 50.

As the cam is rotated, the bell crank 243 is angularly reciprocated with respect to the axis of the shaft 131, and the displacements of the bell crank which occur in a vertical plane are converted into horizontal displacements of the actuator arm 231b through the linkage structure 241–242. Thus, the displacement device 229b repetitively traverses the arcute path indicated in FIGURE 15, and the frequency of such vibratory displacements is determined by the concentration of the rises and falls of the cam surface 246.

The angular displacements imparted to the pin 232b as a consequence of the described motions causes the lever 235 to reciprocate angularly relative to the axis of the pin 232b, and such motion of the lever energizes a corresponding motion in the lever 237 which is transmitted thereby to the displacement device 229a. It may be noted that a positive displacement is imparted to the lever 237 causing it to move outwardly with the lever 235, but inward movement of the lever 237 is yieldable because it is caused for the most part by the spring 239. Motion enforced on the lever 235 is also transmitted in attenuated form from the actuator arm 231b to the actuator arm 231a through the tension spring 234. Thus, the two displacement devices 229 are simultaneously vibrated in the same directions (i.e., concurrently inwardly and then outwardly) to effect transverse alignment of the bags in each group advanced therepast.

Vertical alignment of the bags in each group is insured by displacement-imparting devices or joggers 248a and 248b which are respectively affixed to actuator arms 249a and 249b. The arms 249 are respectively secured to a shaft 250 so that relative rotation therebetween is prevented. The shaft is supported for pivotal movement and secured thereto to effect angular displacements thereof is a lever arm 251 which is pivotally connected by a pin 252 to one end of a push rod 253. At its opposite end, the push rod 253 is pivotally connected by a pin 254 to one leg of a bell crank 255 supported for pivotal movement intermediate the ends thereon by a tubular collar or sleeve mounted upon the aforementioned shaft 131. The other leg of the bell crank is equipped with a cam follower 256 that engages the surface 246 of the aforementioned cam 247.

The cam follower 256 is resiliently biased into engagement with the surface 246 of the cam by a tension spring 257 which at one end is anchored to the frame structure of the apparatus, and at its other end is fastened to the bell crank through a leg 258 provided thereby. As the cam is rotated, the cam follower 255 is angularly reciprocated and vibratory displacements are thereby imparted to the devices 248, each of which is connected to the shaft 250. The frequency of the vibratory displacements imparted to the devices 248 is sufficient to effect vertical alignment of the bags as a group thereof is advanced over such devices.

From the foregoing, the operation of the bag-aligning unit is apparent, and simply stated, as each group of bags is displaced forwardly by the pusher fingers as they advance into the position thereof illustrated by broken lines in FIGURE 15, the group of bags being displaced thereby is positioned above the vertical displacement devices 248 and between the transverse displacement devices 229. The two devices impart vibratory motions to the bag group and thereby effect sufficient relative movement between the bags thereof to bring about a condition of alignment.

Figure 17:
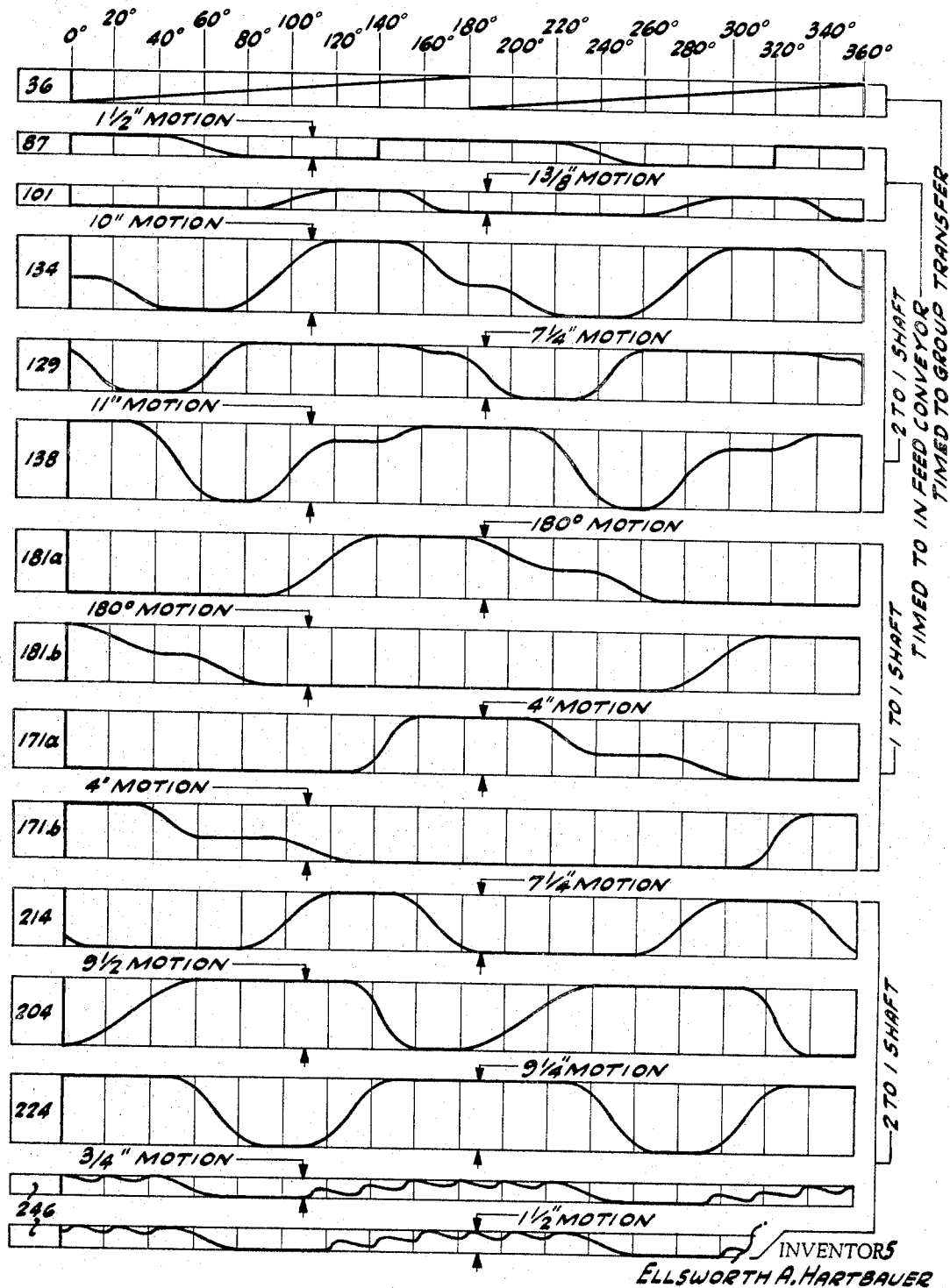
FIGURE 17 is a chart or graph showing the timing interrelationships of various components and mechanisms of the apparatus.

It may be noted in FIGURE 16, and more accurately in FIGURE 17, that the configuration of the cam 47 progressively moves the transverse displacement devices 229 inwardly toward the innermost position thereof shown in FIGURE 15. That is to say, the mean position of the vibratory displacements progresses inwardly so that initially only small inward displacement forces are imparted to the bag group and such forces thereafter become of greater magnitude. Thus, the bag group is progressively directed toward the path of movement defined by the innermost positions of the devices 229. It might be noted that the relationship of the upward displacement forces imparted by the devices 248 to the transverse displacement forces is such that during relatively high speed operation of the apparatus, transverse forces may be imparted to the group when it is elevated and, therefore, not resting on a support surface. Evidently, the transverse forces applied at this time are much more effective to bring about a condition of alignment of the bags in the group.

*Operation*

In the foregoing description, each of the sections and units thereof has been explained in connection with an operational sequence. Accordingly, it would appear redundant to include an overall operational sequence. In this connection, however, reference may be made to FIGURE 17 which graphically presents an overall operational sequence in terms of the time relationship of the various components. Thus, along the left-hand side of the graph of FIGURE 17 are designated by parts number the cams to which the various curves are applicable. Along the top of the graph an operational sequence is broken down into angular degrees and, therefore, at any particular instant of time, which instant has a particular angular-degree value, the condition of any cam is determined by noting the character of the curve therefor at such angular position. As a further aid, and by way of specific example only since it pertains to one particular apparatus, the motions imparted by such cams in terms of their actual lengths (linear inches and angular degrees) are included in FIGURE 17.

As a general observation, it may be noted that the turning plates 142–143 describe a complete path of movement of approximately 180° in length since they grip a bag group at a central intermediate position, as shown in FIGURE 3 by the plate 142b, rotate the gripped group through approximately 90°, and then traverse an additional distance of approximately 90° in moving to the outermost position shown by the plate 142a in FIGURE 3. The plates have a slight period of dwell at about the lowermost position thereof during which the plates are opened to enable the group of bags to be dropped therefrom and onto the platform therebelow. This interruption in the angular motion of the plates largely prevents impact of the bag group against the associated stop 183.

As the transfer platforms 120 are returned toward the pick-up station, they traverse a somewhat arcuate path, as shown best in FIGURE 5. More particularly, as the transfer platforms leave the position denoted 120a″, they move rearwardly and downwardly, as shown by the broken-line path in this figure. This enables the transfer platforms to clear portions of the turning plates which would otherwise obstruct the return movement of the platforms.

While in the foregoing specification an embodiment of the invention has been set forth in considerable detail for purposes of making a complete disclosure thereof both as to its method and apparatus aspects, it will be apparent to those skilled in the art that numerous changes may be made in such details without departing from the spirit and principles of the invention.

We claim:

1. In a method of collating paper bags and like articles being discharged in substantially continuous succession along a predetermined path and in essentially the same orientation, the steps of collecting such bags into a plurality of groups, angularly displacing alternate groups relative to each other along a plane substantially parallel to the planes of the bags comprising any such group being displaced and without substantial translational movement thereof to collate successive groups into an end-for-end orientation, and translationally advancing such successive groups preparatory to bundling the same.

2. The method of claim 1 in which the step of angularly displacing alternative groups of bags relative to each other comprises displacing successive alternate groups of bags in opposite angular directions through substantially the same angular distances in each instance to effect the aforesaid end-to-end orientation of the successive groups.

3. The method of claim 2 in which said angular distances approximate 90° in each instance.

4. The method claim 2 including the further step of transferring such collected bags group-by-group into a collating station whereat each group is angularly displaced as aforesaid.

5. The method of claim 2 including the further step of aligning the bags in each group within defined limits following angular displacement thereof.

6. The method of claim 5 in which said step of aligning the bags in each group thereof includes imparting repetitive displacement forces in at least one direction to at least certain of the bags in each group to effect relative displacements of the bags thereof in at least such one direction.

7. The method of claim 6 in which such displacement forces are imparted to the bags along the lengths thereof and are concentrated at least in the first instance against the closed ends of such bags.

8. The method of claim 6 in which the additional step is included of imparting displacement forces to such bags in a direction substantially normal to the aforesaid direction so that the bags in any one group are aligned both along the longitudinal and transverse axes thereof.

9. The method of claim 2 including the further step of assembling the translationally advanced groups preparatory to bundling the same.

10. In a method of collating paper bags and like articles being discharged in substantially continuous succession along a predetermined path and in essentially the same orientation, the steps of collecting such bags into a plurality of groups, transferring in order each successive group into a turning station, angularly displacing alternate groups of bags at such turning station in opposite angular directions through substantially the same angular distances in each instance along a plane substantially parallel to the planes of the bags comprising any such group being displaced and without substantial translational movement thereof to collate successive groups into an end-for-end orientation, and translationally advancing each angularly displaced group from such turning station.

11. The method of claim 10 in which said angular distances approximate 90° in each instance.

12. The method of claim 11 including the further step of aligning the bags in each group within defined limits following angular displacement thereof.

13. In apparatus for dividing bags discharged from a bag-making machine in a stream constituting a substantially continuous end-to-end succession of bags oriented in essentially the same direction and moving along a predetermined path, mechanism for interrupting such stream of bags and diverting the same from such end-to-end disposition into side-by-side juxtaposition all oriented in the same direction, divider structure for separating such diverted bags into groups, and conveyor mechanism for displacing such bags group-by-group toward a collating station, said conveyor mechanism defining an arcuate path that dips downwardly between the entrance and discharge ends thereof to cause the upper ends of bags being advanced therealong to converge toward the central portion of the path of movement.

14. The apparatus of claim 13 in which said divider structure comprises a counter-finger device selectively insertable into the mass of diverted bags to separate two adjacent bags and thereby establish the final bag in one group and the first bag in the following group, and actuator mechanism for timing the insertion of said counter-finger device into such mass to divide the same into bag groups of predetermined number.

15. In apparatus for dividing bags discharged from a bag-making machine in a stream constituting a substantially continuous end-to-end succession of bags oriented in essentially the same direction and moving along a predetermined path, a conveyor mechanism for collecting bags thereon and for advancing the same laterally from such path of movement, said conveyor mechanism including a pair of transversely spaced endless chains equipped at spaced apart intervals therealong with lugs movable between an extended position projecting above the path of movement defined by said conveyor mechanism and a retracted position, mechanism including said conveyor for interrupting such stream of bags and diverting the same from such end-to-end disposition thereof into side-by-side juxtaposition on said conveyor, a counter-finger device selectively insertable into the mass of bags moving along said conveyor to divide the bags into groups, actuator mechanism for timing the insertion of said counter-finger device into such mass of bags so as to form groups each having a predetermined number of bags therein, and trigger structure for selectively displacing lugs into the space defined by said counter-finger device between adjacent groups established thereby.

16. In apparatus for collating bags and like articles divided into groups having the bags thereof all oriented in the same direction, mechanism for transferring each group of bags from a group infeed station to a group collating station comprising front and rear transfer devices the first of which is adapted to engage a group of bags along the leading bag in such group and the other of which is adapted to engage such group along the last bag therein, said devices being operative to grip a group of bags located therebetween and bodily displace such group from said infeed station to said collating station, said rear transfer device being reciprocable between a retracted position remote from groups of bags at said infeed station and an extended position in which it is inserted between adjacent groups of bags thereat to engage the group forwardly thereof and, in cooperation with said forward transfer device, advance such group into the collating station, and drive mechanism for controlling and moving said transfer devices.

17. The apparatus of claim 16 in which said rear transfer device is generally L-shaped and provides a platform receiving such group of bags thereon and provides also an upwardly extending back engageable with the last bag in such group.

18. The apparatus of claim 16 in which said front and rear transfer devices are separately controlled and manipulated, and in which said drive mechanism includes separately controlled actuators respectively connected with said transfer devices.

19. In apparatus for collating bags and like articles divided into groups in which all of the bags are oriented in the same direction, first and second group-collating devices located at a common collating station and being mounted for angular displacements toward each other about spaced apart and substantially parallel translationally fixed axes and each device being operative to grip a group of bags and turn the same angularly along a plane substantially parallel to the plane thereof through a predetermined arcuate distance to alter the orientation thereof into an end-for-end disposition, one of said group-collating devices being operative to orient the bottoms of the groups of bags gripped thereby in one direction and the other of said devices being operative to orient the bottoms of the groups of bags gripped thereby in the opposite direction, mechanism for advancing successive groups of bags into a position at such collating station to be gripped by one or the other of said collating devices, means for alternately energizing said devices in timed relation with said mechanism, and mechanism for advancing groups of bags oriented by said collating devices toward a discharge station.

20. The apparatus of claim 19 in which each of said collating devices comprises a pair of gripper plates relatively movable toward and away from each other through a cycle of operation to receive a group of bags therebetween, to grip a group while turning it and to thereafter release the same, and drive means for effecting such movement of the gripper plates between such open and closed positions thereof.

References Cited

UNITED STATES PATENTS

| | | | |
|---|---|---|---|
| 2,759,203 | 8/1956 | Kramer | 93—93.3 XR |
| 2,768,489 | 10/1956 | Brown et al. | 93—93.3 XR |
| 2,943,539 | 7/1960 | Lytle et al. | |
| 3,236,162 | 2/1966 | Reist | 93—93 |

BERNARD STICKNEY, *Primary Examiner.*